United States Patent
Haller

(10) Patent No.: US 11,679,697 B2
(45) Date of Patent: Jun. 20, 2023

(54) DEVICE FOR ADJUSTING A SEAT POSITION

(71) Applicant: GRAMMER AG, Ursensollen (DE)

(72) Inventor: Erwin Haller, Birgland (DE)

(73) Assignee: GRAMMER AG, Ursensollen (DE)

( * ) Notice: Subject to any disclaimer, the term of this patent is extended or adjusted under 35 U.S.C. 154(b) by 202 days.

(21) Appl. No.: 17/082,176

(22) Filed: Oct. 28, 2020

(65) Prior Publication Data

US 2021/0122266 A1 Apr. 29, 2021

(30) Foreign Application Priority Data

Oct. 29, 2019 (DE) .......................... 102019129161.5

(51) Int. Cl.
*B60N 2/16* (2006.01)
*B60N 2/10* (2006.01)

(52) U.S. Cl.
CPC .............. *B60N 2/1695* (2013.01); *B60N 2/10* (2013.01); *B60N 2/164* (2013.01); *B60N 2/1665* (2013.01)

(58) Field of Classification Search
CPC ...... B60N 2/1615; B60N 2/164; B60N 2/502; B60N 2/507; B60N 2/1695; B60N 1/1665; B60N 2/10
USPC ....................................... 297/344.16, 344.17
See application file for complete search history.

(56) References Cited

U.S. PATENT DOCUMENTS

| 3,917,211 | A | * | 11/1975 | Daunderer | ............. | B60N 2/164 248/421 |
| 4,128,225 | A | | 12/1978 | Kluting et al. | | |
| 4,326,690 | A | | 4/1982 | Pickles et al. | | |
| 4,842,334 | A | | 6/1989 | Voss et al. | | |
| 10,384,571 | B2 | * | 8/2019 | Lorey | ..................... | B60N 2/522 |
| 2002/0060488 | A1 | * | 5/2002 | Delmas | .................. | B60N 2/164 297/344.16 |
| 2004/0075322 | A1 | * | 4/2004 | Jaeger | .................. | B60N 2/0224 297/325 |
| 2006/0261647 | A1 | | 11/2006 | Maas et al. | | |

(Continued)

FOREIGN PATENT DOCUMENTS

| CN | 110293883 | 10/2019 |
| DE | DD 60704 | 3/1968 |
| DE | 2306478 | 8/1974 |

(Continued)

OTHER PUBLICATIONS

Official Action for German Patent Application No. 102019129159.3, dated Jun. 22, 2020, 7 pages.

(Continued)

*Primary Examiner* — Sarah B McPartlin

(74) *Attorney, Agent, or Firm* — Sheridan Ross P.C.

(57) ABSTRACT

The invention relates to a device for adjusting a seat position for a vehicle seat, which comprises at least one support element for a seat part and can be connected to a seat substructure, the device comprising at least one first leg and at least one second leg, the legs being rotatably arrangeable on the seat substructure and the at least one support element, the at least one first leg and the at least one second leg being mechanically coupled by a connecting element, the length of which can be modified, wherein a modification of the length of the connecting element causes a change in an angle of inclination θ of the support element.

17 Claims, 12 Drawing Sheets

(56) References Cited

U.S. PATENT DOCUMENTS

2012/0187735 A1* 7/2012 Foelster ............... B60N 2/1615
297/344.17

FOREIGN PATENT DOCUMENTS

| DE | 2626442      | 12/1977 |
|----|--------------|---------|
| DE | 3437962      | 4/1986  |
| DE | 3447040      | 6/1986  |
| DE | 19848952     | 5/2000  |
| DE | 19914163     | 10/2000 |
| DE | 19927930     | 4/2001  |
| DE | 29824882     | 3/2003  |
| DE | 102010049365 | 8/2011  |
| DE | 102010044057 | 5/2012  |
| DE | 102017213169 | 1/2019  |
| EP | 0882619      | 12/1998 |
| EP | 2360051      | 8/2011  |
| EP | 1863671      | 1/2012  |
| GB | 1208051      | 10/1970 |
| GB | 1307749      | 2/1973  |
| GB | 2081082      | 2/1982  |
| WO | WO 2011/131875 | 10/2011 |
| WO | WO 2019/096774 | 5/2019  |

OTHER PUBLICATIONS

Official Action for German Patent Application No. 102019129161. 5, dated Jun. 22, 2020, 7 pages.
Official Action for German Patent Application No. 102019129162. 3, dated Jun. 22, 2020, 7 pages.
Official Action for U.S. Appl. No. 17/082,153, dated Mar. 2, 2022 5 pages.
Official Action for U.S. Appl. No. 17/082,209, dated Jan. 11, 2022 8 pages.
U.S. Appl. No. 17/082,153, filed Oct. 28, 2020, Haller.
U.S. Appl. No. 17/082,209, filed Oct. 28, 2020, Haller.
Extended European Search Repost for European Patent Application No. 20203397.3, dated Mar. 12, 2021, 8 pages.
Extended European Search Report for European Patent Application No. 20203398.1, dated Mar. 24, 2021, 7 pages.
Extended European Search Report for European Patent Application No. 20203400.5, dated Mar. 26, 2021, 7 pages.
Official Action with English Translation for German Patent Application No. 102019129159.3, dated Sep. 10, 2021, 5 pages.
Official Action with English Translation for German Patent Application No. 102019129161.5, dated Sep. 10, 2021, 5 pages.
Official Action with English Translation for German Patent Application No. 102019129162.3, dated Sep. 10, 2021, 7 pages.
Official Action (with English translation) for China Patent Application No. 2020111766594, dated Jul. 7, 2022, 11 pages.
Official Action with English Translation for China Patent Application No. 202011179543.6, dated Jul. 4, 2022, 15 pages.
Official Action with English Translation for China Patent Application No. 202011183663.3, dated Jul. 11, 2022, 14 pages.
Notice of Allowance for U.S. Appl. No. 17/082,153, dated Jun. 23, 2022 6 pages.
Official Action for U.S. Appl. No. 17/082,209, dated Aug. 18, 2022 7 pages.
Official Action with English Translation for China Patent Application No. 202011179543.6, dated Feb. 5, 2023, 11 pages.
Official Action with English Translation for China Patent Application No. 202011183663.3, dated Feb. 13, 2023, 17 pages.
Notice of Allowance for U.S. Appl. No. 17/082,209, dated Mar. 20, 2023 6 pages.
Official Action for U.S. Appl. No. 17/082,209, dated Dec. 5, 2022 6 pages.

* cited by examiner

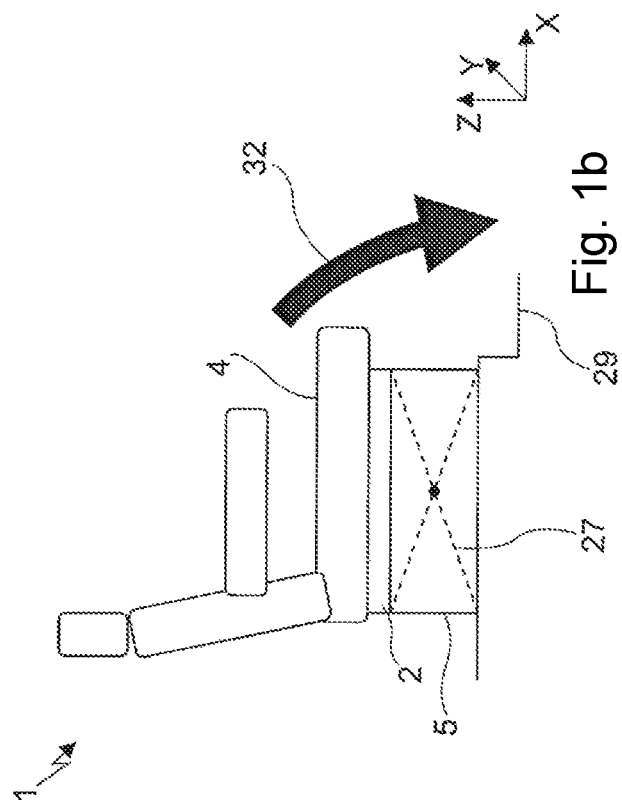
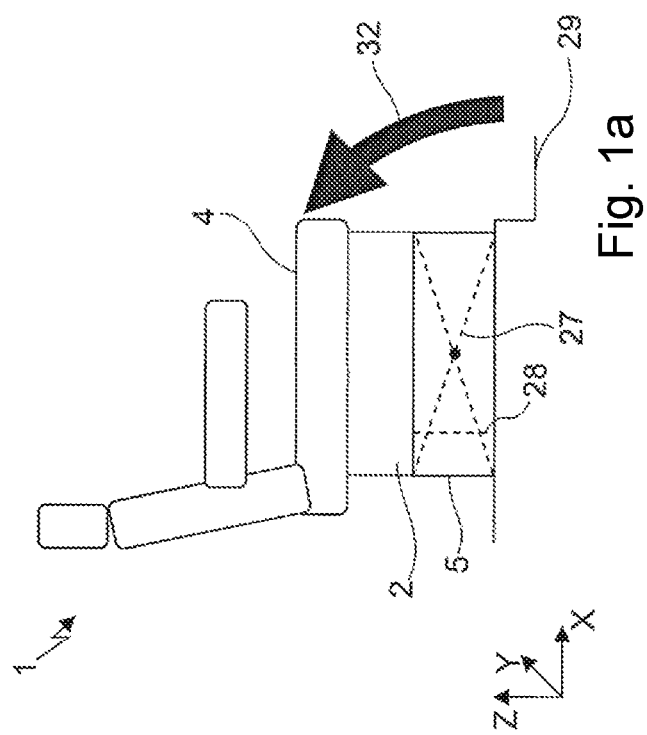

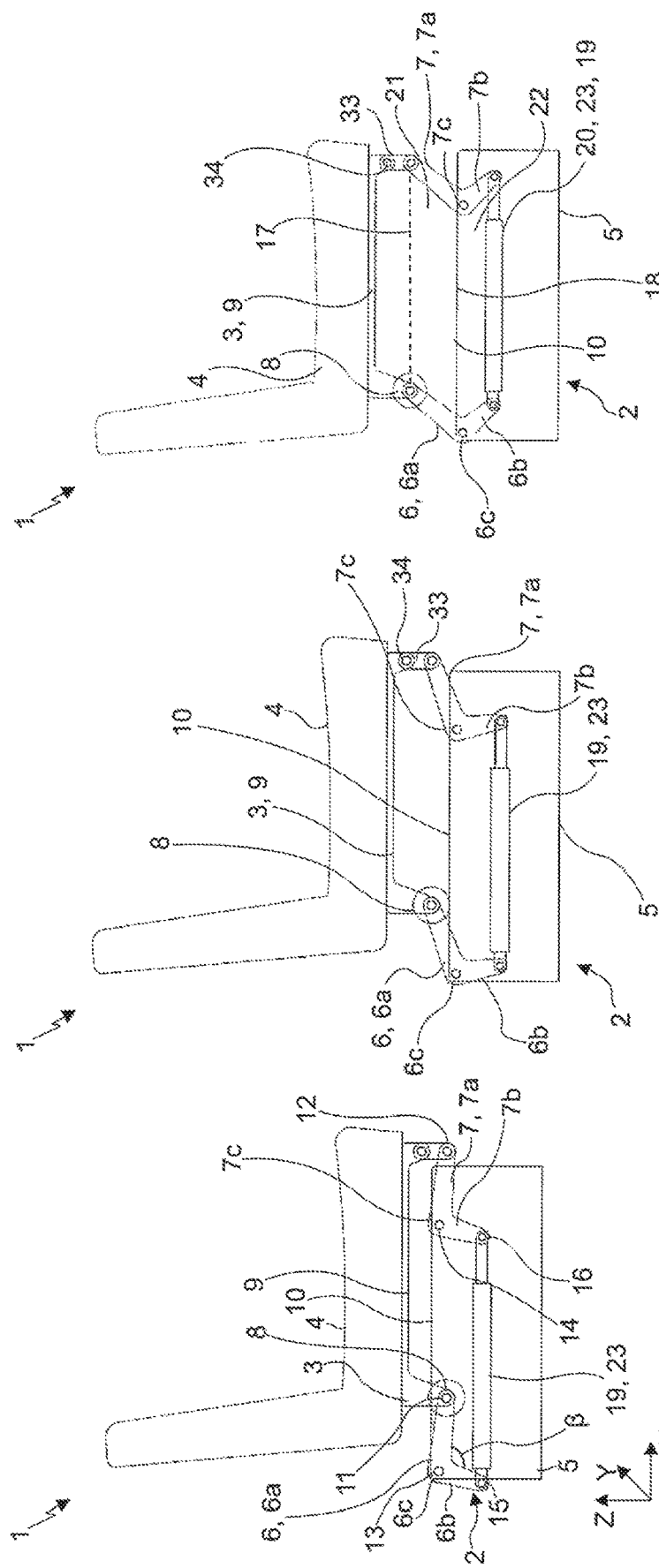

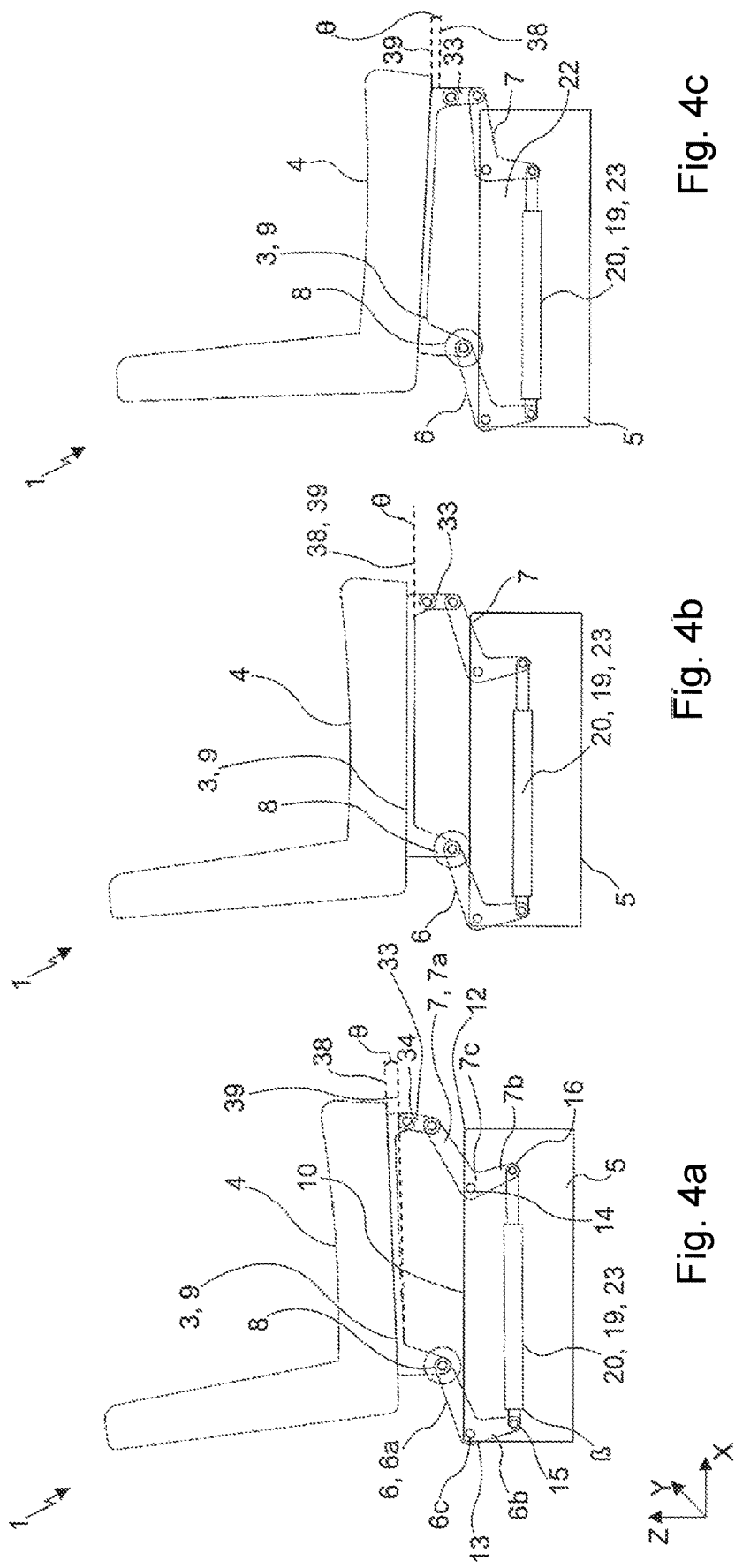

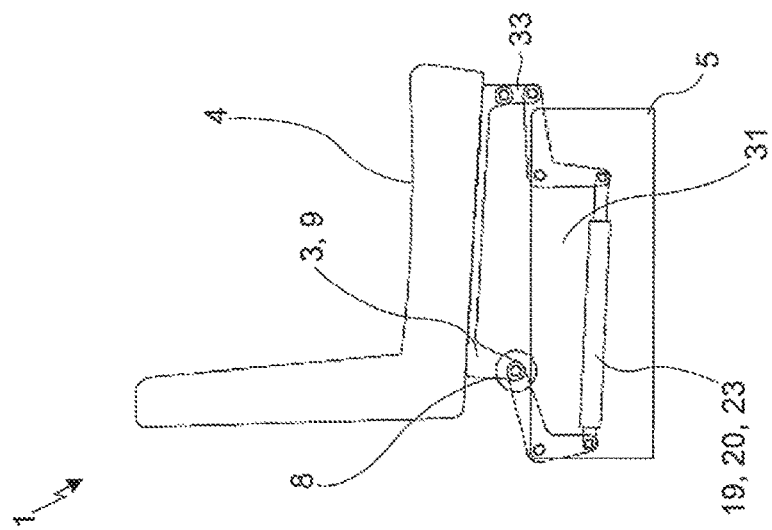
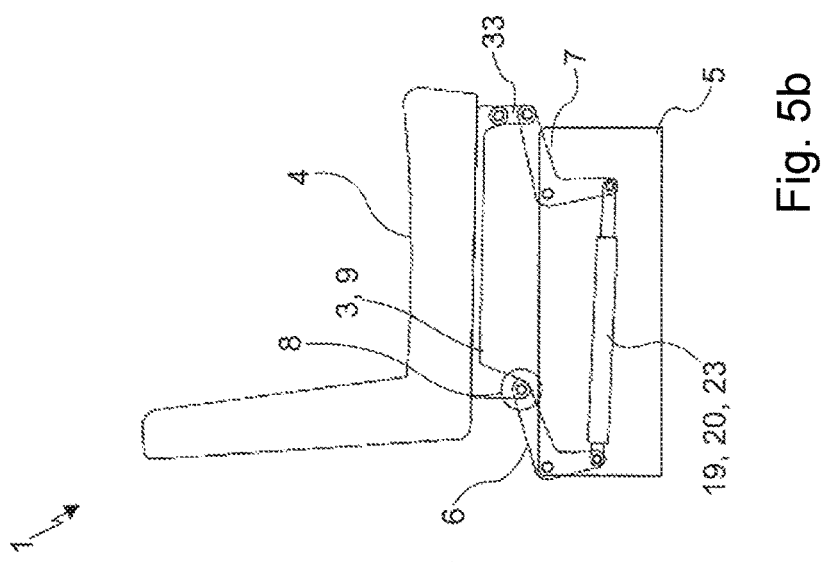
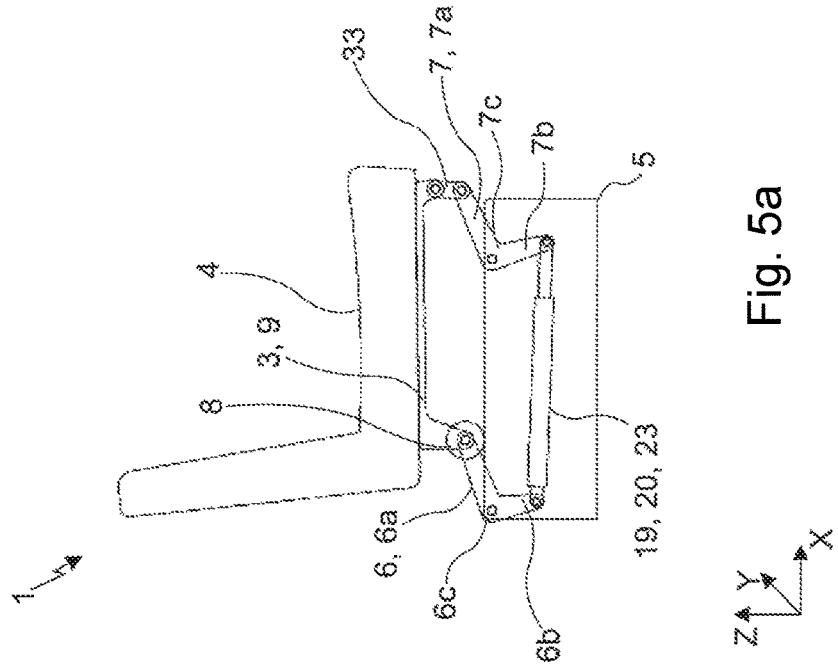
Fig. 5c
Fig. 5b
Fig. 5a

DEVICE FOR ADJUSTING A SEAT POSITION

CROSS-REFERENCE TO RELATED APPLICATIONS

This application claims the benefit of German Patent Application No. 10 2019 129 161.5 filed Oct. 29, 2019, the entire contents of which are incorporated herein by reference.

FIELD

The invention relates to a device for adjusting a seat position for a vehicle seat, the device being connectable to at least one support element for a seat part and a seat substructure.

BACKGROUND

Devices of this type are provided in particular for vehicle seats in commercial vehicles such as tractors, construction machinery, forklifts, lorries, etc. Vehicle seats of this type, in particular driver seats, in commercial vehicles must meet special requirements relating to seat ergonomics, since the occupants, or drivers, generally have to spend long periods of time in these seats. It is desirable that the vehicle seat can be optimally adjusted with regard to different seat positions. It should also be taken into account that the vehicle seat is used by occupants of different sizes and must therefore be adjusted accordingly. Such a large number of adjustment options for the vehicle seat often causes the vehicle seat to be undesirably complex.

SUMMARY

The object of the present invention is to provide a vehicle seat that overcomes the disadvantages mentioned above.

The object is achieved by a device for adjusting a seat position for a vehicle seat, which device comprises at least one support element for a seat part and which can be connected to a seat substructure, the device comprising at least one first leg and at least one second leg, the legs being rotatably arrangeable on the seat substructure and the at least one support element, the at least one first leg and the at least one second leg being mechanically coupled by a connecting element, the length of which can be modified, wherein a modification of the length of the connecting element causes a change in an angle of inclination $\theta$ of the support element or the seat part, respectively.

The device according to the invention allows for the inclination of the seat surface to be adjusted easily, with the seat surface being the uppermost surface of the seat part on which the occupant sits. For some occupants, it is more comfortable if the seat surface is not exactly horizontal, but rather inclined slightly forward. Other occupants prefer to tilt the seat surface backwards. From an ergonomic point of view, the seat surface should be inclined such that the thighs rest lightly and without pressure on the seat part. The more the thigh is supported, the better the sitting pressure is distributed. This leads to noticeable relief, especially on long journeys. The device accordingly allows for an ergonomically relevant seat parameter to be easily adjustable. Furthermore, the device is designed to be extremely simple in construction and is therefore inexpensive to manufacture.

The device, or the vehicle seat, respectively, extends along a height axis Z. An advantageous shift along the height axis Z can take place in the downward direction, i.e. in the direction of the vehicle floor, or in the upward direction. The device, or the vehicle seat, also extends along a longitudinal axis X. An advantageous shift along the longitudinal axis X can take place in the forward direction, i.e. in the direction of the pedals, or in the backward direction. Finally, the device, or the vehicle seat, extends along a width axis Y.

The term "substantially" used below should be construed as including minor tolerance deviations. Thus, the deviation may be an angle of preferably less than 10°, more preferably less than 7.5°, even more preferably less than 5°.

According to a particularly preferred embodiment, the angle of inclination $\theta$ extends between a central axis of the at least one support element and a reference axis which is substantially parallel to a longitudinal axis X of the device. Accordingly, the at least one support element is arranged in a first plane which comprises the central axis. The seat surface of the seat part is advantageously arranged substantially parallel to the first plane. The reference axis is included in a reference plane which is spanned by the longitudinal axis X and the width axis Y. The reference plane is preferably substantially parallel to a body floor. In the case of a horizontal alignment of the at least one support element or the seat surface, the angle of inclination $\theta$ is substantially 0°. The angle of inclination $\theta$ can preferably be adjusted in a range between −60° and +60°, preferably in a range between −45° and +45°, and more preferably in a range between −30° and +30°. Given an advantageous inclination towards the rear, the angle $\theta$ would accordingly assume positive values. With an advantageous inclination toward the front, the angle of inclination $\theta$ would accordingly assume negative values. The change in the angle of inclination $\theta$ is preferably proportional to the change in the length of the connecting element.

According to a particularly preferred embodiment, the connecting element is suitable and provided for maintaining the modifiable length thereof, preferably until a new modification is carried out. This means that the length of the connecting element is adjustable and the adjusted length is then held by the connecting element until a new adjustment is made. The connecting element can advantageously be controlled by means of an operating and control device. It is advantageous that the operating and control device comprises a memory device by means of which certain length values of the connecting element can be stored. Since the determined length values correspond to certain angles of inclination $\theta$, preferred inclination settings can thus be stored and selected accordingly by the user. The length of the connecting element is advantageously continuously adjustable.

According to a preferred embodiment, the connecting element is a lockable gas spring. According to a further advantageous embodiment, the connecting element is an adjusting element. The adjusting element preferably comprises a screw jack. This screw jack is driven by a corresponding advantageous actuator, which can preferably be an electric motor.

According to a particularly preferred embodiment, the at least one first leg is arranged along the longitudinal axis X behind the at least one second leg. It is advantageous that the at least one first leg is connected to the at least one second leg along the longitudinal axis by means of a first longitudinal connection. The first longitudinal connection is advantageously realised by the at least one support element or by the seat part. Furthermore, it is advantageous that the at least one first leg and the at least one second leg are connected along the longitudinal axis X by means of a second longitudinal connection. The second longitudinal connection is preferably realised by the seat substructure. The mechanical coupling preferably comprises the first and the second longitudinal connection. Advantageously, the first and the second longitudinal connection are rigid connections and thus not changeable in their length.

A third longitudinal connection along the longitudinal axis X between the second section of the at least one first leg and the second section of the at least one second leg is preferably realised by the connecting element. The mechanical coupling advantageously comprises the third longitudinal connection, the length of which can be modified.

According to a further preferred embodiment, the at least one first leg and the at least one second leg each comprise a first section and a second section. The first and the second section preferably enclose an angle $\beta$. As a result, the at least one first leg and the at least one second leg are advantageously designed in a substantially L-shaped manner. A bend region is preferably provided between the first section and the second section.

According to a further preferred embodiment, the at least one first leg and the at least one second leg are each mounted so as to be rotatable about an axis of rotation relative to the support element. The at least one first leg and the at least one second leg are advantageously mounted rotatably about a further axis of rotation relative to the seat substructure. The axis of rotation is preferably arranged in an upper end region of the first section relative to the support element with respect to the rotation. The axis of rotation is preferably arranged in the bend region relative to the seat substructure with respect to the rotation.

According to a further preferred embodiment, the connecting element is arranged between the second section of the first leg and the second section of the second leg. The mechanical coupling between the at least one first leg and the at least one second leg preferably comprises a connection of the second sections by means of the connecting element. The respective second section is preferably rotatable about an axis of rotation relative to the connecting element. The axis of rotation is advantageously arranged with respect to a rotation of the at least one first leg or the at least one second leg relative to the connecting element in a lower end region of the respective second section.

According to a further advantageous embodiment, the at least one first leg and the support element enclose a first angle $\alpha$. This angle $\alpha$ is preferably adjustable by an angle adjustment device. A change in the angle $\alpha$ causes a displacement of the at least one support element along a height axis Z and along a longitudinal axis X. Preferably, a change in the angle $\alpha$, which causes a downward displacement of the at least one support element along the height axis Z, also causes a forward displacement of the at least one support element along the longitudinal axis X. A change in the angle $\alpha$, which causes the at least one support element to be displaced upwards along the height axis Z, preferably causes the at least one support element to be displaced backwards along the longitudinal axis X at the same time. A displacement of the at least one support element accordingly results in a corresponding displacement of the seat part arranged on the support element. The advantageous device is therefore used to adjust the seat position along the height axis Z with a synchronous correction of the seat position along the longitudinal axis X. Such a synchronised adjustment along the height axis Z and at the same time along the longitudinal axis X results in a quick ergonomic adjustment of the seat position for short and tall drivers. As a rule, short drivers need lower seat heights and at the same time have to sit further forward along the longitudinal axis X. In contrast, tall drivers have to position themselves further upward along the height axis Z and further backward along the longitudinal axis X. The seat position can accordingly be changed simultaneously downward and forward or upward and backward by actuating the angle adjustment device. This makes it possible for the seat position to be adjusted extremely quickly and easily. The advantageous embodiment makes it possible for two further ergonomically relevant seat parameters, namely the seat height and the distance from the pedals, to be changed simultaneously. In order to adjust the seat position along the height axis Z and along the longitudinal axis X, only the advantageous angle adjustment device has to be actuated. Advantageously, the angle $\alpha$ is held by the angle adjustment device until it is actuated again. The angle adjustment device can accordingly also be viewed as an angle locking device.

Adjusting the angle $\alpha$ accordingly changes the alignment of the at least one first leg. Accordingly, the first leg is advantageously turned or rotated about a corresponding direction of rotation. Due to the mechanical coupling between the at least one first leg and the at least one second leg, the rotation of the at least one first leg is transferred to the at least one second leg. Accordingly, the at least one second leg moves or rotates analogously to the at least one first leg. The movement of the entirety of the at least one first leg and the at least one second leg advantageously results in the displacement of the at least one support element or the seat part. Accordingly, the angle adjustment device can advantageously only act directly on the at least one first leg. The angle adjustment device preferably also acts indirectly on the at least one second leg through the aforementioned mechanical coupling.

Advantageously, the angle $\alpha$ extends between a central axis of the first leg 6 and a imaginary reference line of the support element, which is substantially perpendicular to the seat part. The angle $\alpha$ is in a range between 0° and 140°. The angle $\alpha$ is preferably in a range between 0° and 120°. The angle $\alpha$ is more preferably in a range between 0° and 90°. The change in the seat position along the height axis Z and along the longitudinal axis X is advantageously proportional to a change in the angle $\alpha$.

An operating element is preferably provided, by means of which the angle adjustment device can be operated. Accordingly, only one operating device has to be actuated to adjust the seat position. The vehicle seat can preferably also comprise at least one additional adjustment device for the seat position along the longitudinal axis X, by means of which an additional adjustment of the seat position is made possible. This makes it possible to individually adjust the seat position.

It would also be conceivable, however, that the angle $\alpha$ is permanently fixed by means of a corresponding fixing element. The seat position can be adjusted along the height direction Z, or along the longitudinal direction X, by means of further corresponding devices.

According to a further preferred embodiment, the modification of the length of the connecting element causes a rotation of the at least one second leg about the axis of rotation with respect to a rotation relative to the connecting element and about the axis of rotation with respect to a rotation relative to the seat substructure. The modification of the length of the connecting element advantageously causes a rotation of the at least one second leg about the axis of rotation with respect to a rotation relative to the support element. The angle $\alpha$ is advantageously fixed when the length of the connecting element is modified. This can preferably be done by the angle adjustment device or the fixing element. The modification of the length of the connecting element advantageously does not cause any rotation of the at least one first leg. A rotation of the second leg preferably causes the change in the angle of inclination θ.

According to a further idea of the invention, the at least one second leg is indirectly connected to the at least one support element. Preferably, at least the one second leg is connected to the at least one support element by means of a spacing element or a connecting rod. There are thus advantageously two axes of rotation provided with respect to a rotation of the second leg relative to the support element. These two axes of rotation are preferably arranged one above the other along the height axis Z, or spaced apart. This results in an advantageous further degree of freedom which can be used for adjusting an inclination of the seat part.

According to a further preferred embodiment, the at least one second leg is indirectly connected to the at least one support element. The at least one second leg is preferably connected to the support element via a spacing element or a connecting rod. The spacing element or connecting rod is advantageously rotatable about an axis of rotation relative to the at least one second leg. The spacing element or connecting rod is preferably rotatable about a further axis of rotation relative to the support element. The two named axes of rotation are preferably spaced apart from one another. Accordingly, the at least one second leg is connected to the support element by means of two axes of rotation. Such a configuration provides an additional degree of freedom which facilitates the inclination of the support element or the seat part.

According to a further preferred embodiment, the first section of the at least one first leg and the first section of the at least one second leg have the same length. The axes of rotation with respect to the rotation relative to the support element of the at least one first leg and of the at least one second leg preferably lie on a first imaginary or real connecting line. Furthermore, it is preferred that the axes of rotation with respect to the rotation relative to the seat substructure of the at least one first leg and of the at least one second leg lie on a second imaginary or real connecting line. The first connecting line, the second connecting line and the first sections of the at least one first leg and of the at least one second leg advantageously form a trapezoid. Such a trapezoidal shape favours the simultaneous displacement of the seat surface along the height axis Z and the longitudinal axis X. The trapezoid can be a parallelogram if the first sections each have the same length and the first and second connecting lines also have the same length.

The connecting lines which form the advantageous trapezoid or parallelogram can accordingly be real connecting lines, i.e. the connecting line is encompassed by a corresponding element, for example the seat substructure or the support element. However, it would also be conceivable that although there are connections between the legs, these do not represent direct connections between the axes of rotation. Accordingly, for example, the actual connections between the axes of rotation along the height axis Z could lie above or below the imaginary connecting line.

According to a further preferred embodiment, the second section of the at least one first leg and the second section of the at least one second leg have the same length. The axes of rotation with respect to the rotation of the at least one first leg and the at least one second leg relative to the connecting element preferably lie on a third imaginary or real connecting line. It is preferred that the second connecting line, the third connecting line and the second sections of the at least one first leg and the at least one second leg form a second trapezoid. The trapezoid can be a parallelogram if the second sections each have the same length and, furthermore, the second and third connecting lines have the same length.

A change in the length of the connecting element advantageously changes both the first trapezoid and the second trapezoid.

It would of course also be conceivable that the second section of the at least one first leg and the second section of the at least one second leg have different lengths. The at least one second leg could preferably have a second section which is longer than the second section of the at least one first leg. Thus, the second connecting line, the third connecting line and the second sections of the at least one first leg and the at least one second leg would advantageously form a rectangle instead of the second trapezoid. Such an advantageous embodiment means that the seat part or the seat surface is inclined relative to the longitudinal axis X. With a corresponding change in height, or a displacement of the seat part along the height axis Z, the seat part also experiences a change in inclination.

Advantageously, a change in inclination can be compensated for by modifying the length of the connecting element when the seat position changes along the height axis Z and along the longitudinal axis X in the embodiment described, in which the arrangement of the legs describes a general rectangle, so that the support element or the seat surface are aligned substantially horizontally or parallel to the body floor. This can preferably be done automatically. For this purpose, the operating and control device can be connected to corresponding sensors which detect a corresponding change in the seat position. The operating and control device can then calculate the necessary modification of the length of the connecting element and control the connecting element accordingly.

According to a further preferred embodiment, two first legs and two second legs are provided. The two first legs are preferably spaced apart from one another along the width axis Y. The two first legs are preferably rotatable about the same axes of rotation. The two second legs are advantageously spaced apart from one another along the width axis Y. Both second legs are preferably rotatable about the same axes of rotation.

These axes of rotation, about which the pairs of the first legs or the second legs are each rotatable, can preferably be axes which are mounted in a corresponding pivot bearing of the legs. The respective axis of rotation can be a continuous real axis which is mounted in the corresponding pivot bearing of the legs. The axis of rotation can also be a continuous imaginary axis which extends through corresponding pivot bearings of the two legs.

The legs lying opposite one another along the width axis Y are preferably connected by means of at least one transverse connection. These transverse connections can advantageously be realised by the support element or by the seat part. However, it would also be conceivable that the transverse connections are realised by other struts, rods, etc.

According to a further preferred embodiment, at least one support element must be a plate-like element which extends along the longitudinal axis X and the width axis Y. The first and second legs are preferably arranged on the underside of this plate-like element. Accordingly, the first longitudinal connection or the first longitudinal connections are realised by the plate-like element. The seat part is advantageously arranged on the top of the plate-like element. However, it would also be conceivable that a plurality of support elements are provided. The respective transverse connections and the first longitudinal connections would then advantageously be realised by the seat part.

According to a further preferred embodiment, the angle adjustment device comprises a locking device which determines a set angle α. The alignment of the at least one first leg relative to the support element or relative to the seat substructure is therefore preferably defined and held by the locking device. Likewise, the alignment of the at least one second leg relative to the support element or relative to the seat substructure is defined and held by the mechanical coupling between the at least one first leg and the at least one second leg. Such a locking device can preferably be a so-called "recliner." The angle adjustment device advantageously comprises a drive, by means of which the locking device is driven in order to change the angle α. The angle adjustment device is preferably an electrically controllable gear unit. The angle adjustment device preferably comprises a control unit which controls the drive. It is advantageous that certain seat positions can be stored in the control unit. The user can then switch between the saved positions. An operating device by means of which the user can make appropriate inputs is preferably provided.

According to a further preferred embodiment, the device is a modular component. Accordingly, the device for adjusting a seat position for a vehicle seat is advantageously not integrated into other structural components of a vehicle seat. The device can advantageously be arranged between the seat substructure and the seat part. Only the appropriate fastening elements need to be provided. This makes it possible to simplify the structure of the seat substructure. An advantageous vertical suspension, which is independent of the device due to the modular structure, could thus be reduced to its main task, the isolation of the vibrations and the maintenance of the height level. The modular design of the device also makes it possible to retrofit existing vehicle seats with this device in the simplest possible way.

The present object is likewise achieved by a vehicle seat having a device according to any of the described embodiments.

The vehicle seat can be equipped with all the features for the adjustment of a seat position for a vehicle seat already described above in the context of the device individually or in combination with each other and vice-versa.

The vehicle seat can advantageously comprise a scissor frame, by means of which the vehicle seat is attached to the vehicle or the body floor. It is also advantageous that the vehicle seat comprises a spring and/or damping device for the suspension/damping of vertical and/or horizontal vibrations. Due to the already described preferred modular structure, the seat substructure can be configured more simply.

According to a further embodiment, the vehicle seat can comprise a device for adjusting the seat position along the longitudinal axis X. This can be, for example, a rail system on the body floor on which the seat substructure is displaceably arranged.

It is also preferred that the vehicle seat comprises a device for adjusting the inclination of the seat part.

BRIEF DESCRIPTION OF THE DRAWINGS

Other advantages, aims and properties of the present invention are explained with reference to the following description of the attached drawings. Similar components may have the same reference signs in the various embodiments.

In the drawings:

FIG. 1a, 1b show a side views of the vehicle seat according to one embodiment;

FIGS. 2a to 2c show a view of the vehicle seat according to one embodiment in different seat positions;

FIGS. 4a to 4d show a view of the vehicle seat according to one embodiment in different seat positions;

FIGS. 5a to 5c show a views of the vehicle seat according to one embodiment in different seat positions;

DETAILED DESCRIPTION

Figure 3C:
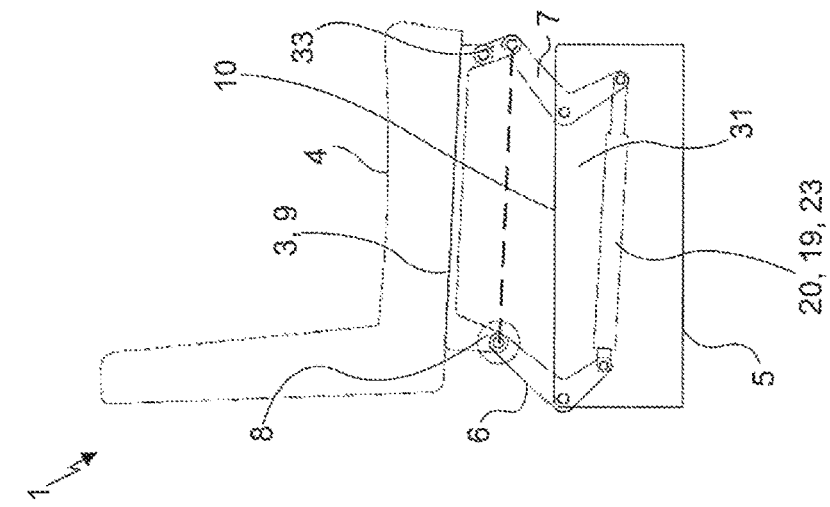
FIGS. 3a to 3c show a view of the vehicle seat according to one embodiment in different seat positions.

FIGS. 1 to 15c show a device 2 for adjusting a seat position for a vehicle seat 1. The device 2 comprises at least one support element 3 for a seat part 4 and can be connected to a seat substructure 5. The device (2) further comprises at least one first leg 6 and at least one second leg 7, the legs 6, 7 being rotatably arranged on the seat substructure 5 and the at least one support element 3, the at least one first leg 6 and the at least one second leg 7 being mechanically coupled by a connecting element 19, the length of which can be modified, with a modification of the length of the connecting element 19 causing a change in an angle of inclination θ of the support element 3.

The vehicle seat, or the device for adjusting the seat position, extends along a height axis Z, a longitudinal axis X and a width axis Y.

The vehicle seat 1 can of course comprise a backrest, a head piece and armrests, as is shown for example in FIGS. 1a and 1b. The seat part 4 can comprise a shell element with a cushion element arranged thereon, or just a cushion element. The seat substructure 5 can advantageously comprise a scissor frame 27, by means of which the vehicle seat 1 is fastened to the vehicle or the body floor 29. Furthermore, it is advantageous that the seat substructure 5 comprises a spring and/or damping device 28 for the suspension/damping of vertical and/or horizontal vibrations. This can be seen in FIGS. 1a and 1b.

As can be seen from FIGS. 1 to 15c, the device 2 for adjusting a seat position is a modular component and can therefore be integrated in a vehicle seat 1 in the simplest possible way. Furthermore, older vehicle seats can be retrofitted with such a modular component.

The at least one first leg 6 is arranged along the longitudinal axis X behind the at least one second leg 7. Furthermore, the at least one first leg 6 and the at least one second leg 7 are connected along the longitudinal axis X by means of a first longitudinal connection 9. The first longitudinal connection 9 realised by the at least one support element 3 or by the seat part 4. In FIGS. 8 to 15*c*, the support element 3 comprises a plate-like element 30 on which the seat part 4 can be arranged. The first longitudinal connection 9 is thus provided by the plate-like element 30.

Furthermore, the at least one first leg 6 is connected to the at least one second leg 7 along the longitudinal axis X by means of a second longitudinal connection 10, which is realised by the seat substructure 5.

The at least one first leg 6 and the at least one second leg 7 each have a first section 6*a*, 7*a* and a second section 6*b*, 7*b*. The first section 6*a*, 7*a* and the second section 6*b*, 7*b* extend substantially in a straight line and thereby enclose an angle β, as a result of which the at least one first leg 6 and the at least one second leg 7 are substantially L-shaped. The angle β is accordingly in a range between 20° and 100°, preferably between 45° and 90°, more preferably between 95° and 85°, and even more preferably 90°. Accordingly, a bend region 6*c*, 7*c* is provided between the first section 6*a*, 7*a* and the second section 6*b*, 6*b*.

The at least one first leg 6 is rotatably mounted about a first axis of rotation 11 relative to the support element 3. The at least one first leg 6 and the support element 3 enclose a first angle α. Advantageously, the angle α extends between a central axis of the first leg 6 and a imaginary reference line of the support element, which is substantially perpendicular to the seat part.

The at least one second leg 7 is rotatably mounted about a second axis of rotation 12 relative to the support element 3. The respective first section 6*a*, 7*a* of the at least one first leg 6 and of the at least one second leg 7 have an upper end region in which the axis of rotation 11, 12 is arranged with respect to the rotation relative to the support element 3.

The at least one first leg 6 is rotatably mounted about a third axis of rotation 13 relative to the seat substructure 5. The at least one second leg 7 is rotatably mounted about a fourth axis of rotation 14 relative to the seat substructure 5. The third axis of rotation 13 and the fourth axis of rotation 14 are arranged in the respective bend region 6*c*, 7*c*. Accordingly, the first section 6*a* of the first leg 6 would substantially extend between the first axis of rotation 11 and the third axis of rotation 13. The first section 7*a* of the second leg 7 substantially extends between the second axis of rotation 12 and the fourth axis of rotation 14.

The connecting element 19 is arranged between the second section 6*b* of the first leg 6 and the second section 7*b* of the second leg 7. The first leg 6 is rotatably mounted about a fifth axis of rotation 15 relative to the connecting element 19. The second leg 7 is rotatably mounted about a sixth axis of rotation 16 relative to the connecting element 19. The fifth axis of rotation 15 and the sixth axis of rotation 16 are each arranged in a lower end region of the second sections 6*b*, 7*b*. The respective second section 6*b*, 7*b* thus substantially extends between the third axis of rotation 13 and the fifth axis of rotation 15 or between the fourth axis of rotation 14 and the sixth axis of rotation 16. Accordingly, a third longitudinal connection 23, modifiable in length, can be defined along the longitudinal axis X, which extends between the second section 6*b* of the at least one first leg 6 and the second section 7*b* of the at least one second leg 7 and is realised by the connecting element 19.

The device 2 comprises two first legs 6 and two second legs 7. The two first legs 6 and the two second legs 7 are each spaced apart from one another along the width axis Y. The two opposing first legs 7 and the two opposing second legs 7 are each substantially identical. The further description of the legs 6, 7 in the form of at least one leg 6, 7 is accordingly to be applied to the respective pair of legs. The two first legs 6 and the two second legs 7 can still be rotatable about the same axes of rotation 11, 12, 13, 14, 15, 16. Furthermore, the legs 6, 7 lying opposite one another along the width axis Y are connected by means of at least one transverse connection 24. Such a transverse connection 24 is realised by the support element 3, which is designed as a plate-like element 30. Furthermore, struts, plates, etc., which likewise form the transverse connection 24, can also be present.

When the length of the connecting element 19 is modified, the distance between the fifth axis of rotation 15 and the sixth axis of rotation 16, or between the two second sections 6*b*, 7*b* of the legs 6, 7 is reduced or increased.

The modification of the length of the connecting element 19 causes the at least one second leg 7 to rotate about at least the sixth axis of rotation 16 and about the fourth axis of rotation 14. Furthermore, the modification of the length of the connecting element 19 can also cause the at least one second leg 7 to rotate about the second axis of rotation 12. The angle α is advantageously defined during the modification, making a rotation about the first axis of rotation 11 impossible. The at least one first leg 6 is therefore not rotated when the length of the connecting element 19 is modified.

The at least one second leg 7 is indirectly connected to the at least one support element 3. The at least one second leg 7 is connected to the support element 3 via a spacing element or a connecting rod 33. The spacing element or connecting rod 33 can be rotated about the second axis of rotation 12 relative to the at least one second leg 7. Furthermore, the spacing element or connecting rod 33 can be rotated about a seventh axis of rotation 34 relative to the support element 3. The spacing element 33 provides additional degrees of freedom, by means of which an adjustment of the inclination of the seat part 4 is facilitated.

Figure 4D:
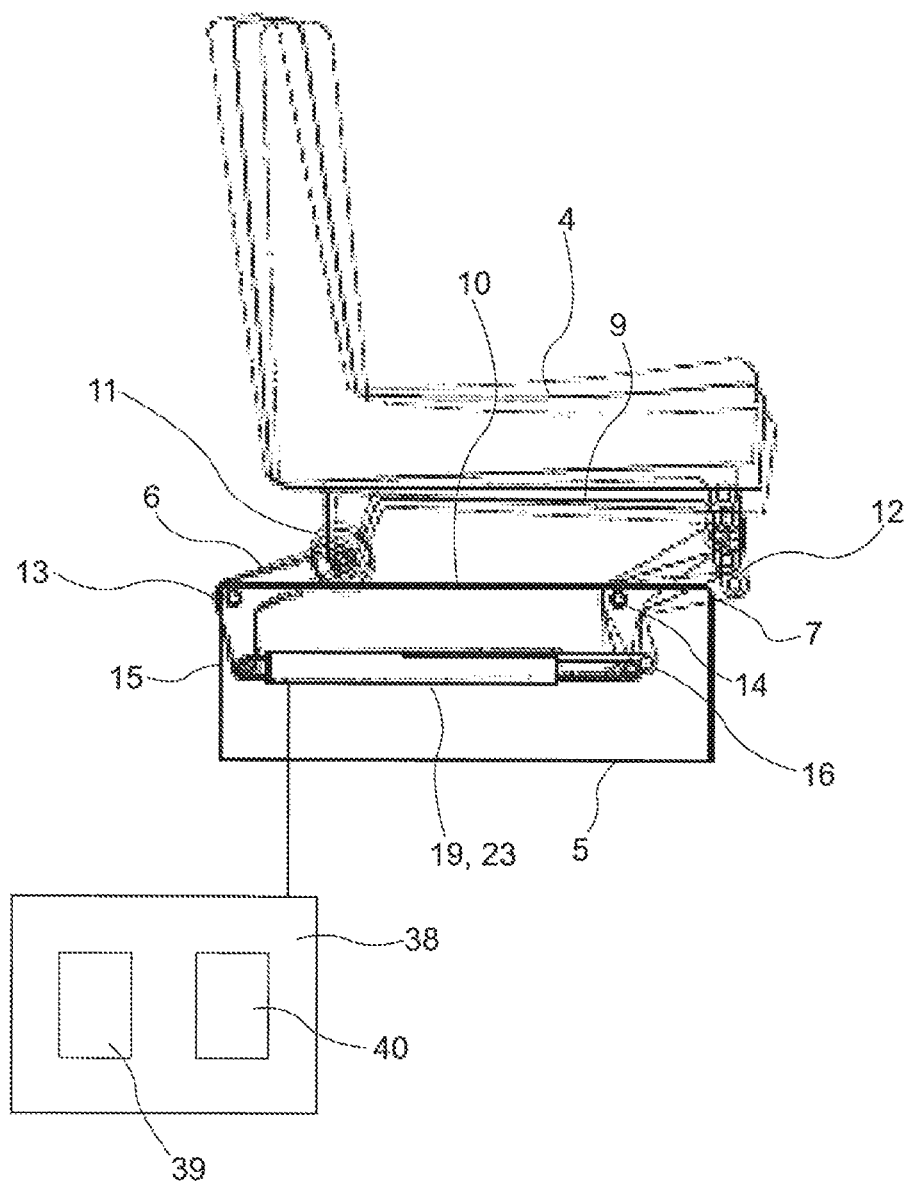
Figure 15A:
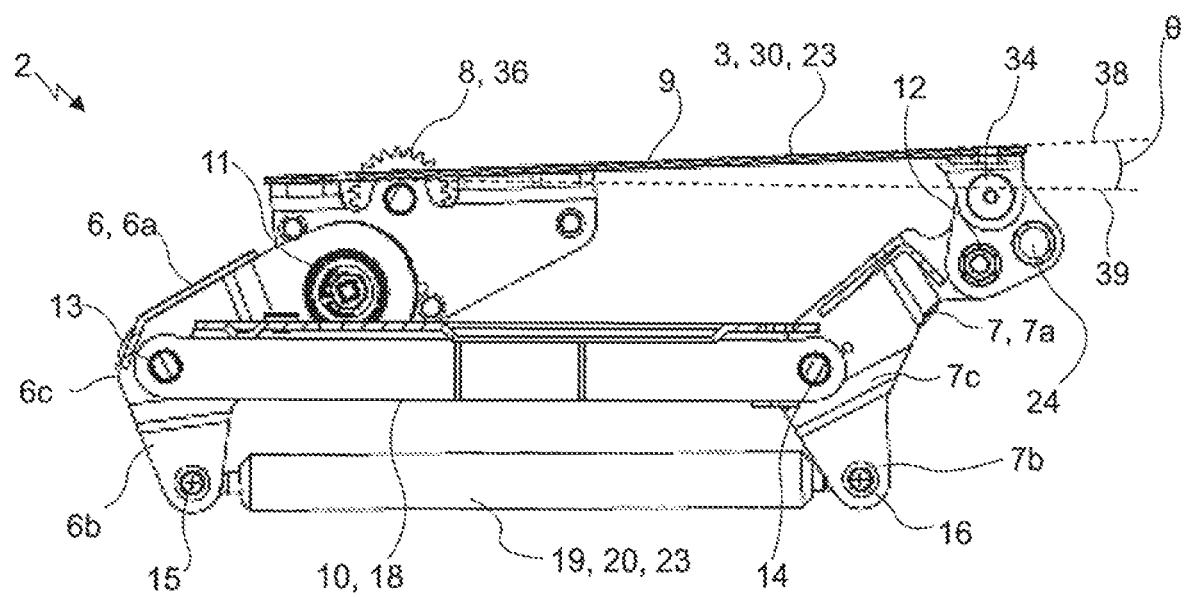
FIGS. 15a to 15c show a side view of the device for the adjustment a seat position in different inclined positions.
Figure 15B:
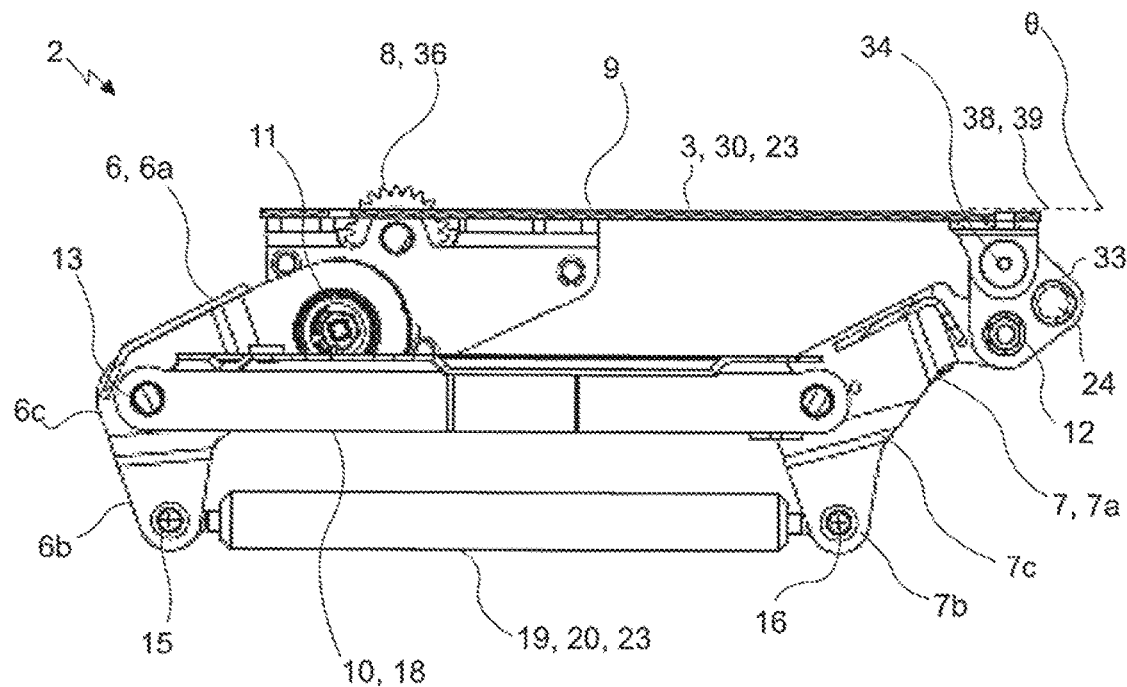
Figure 15C:
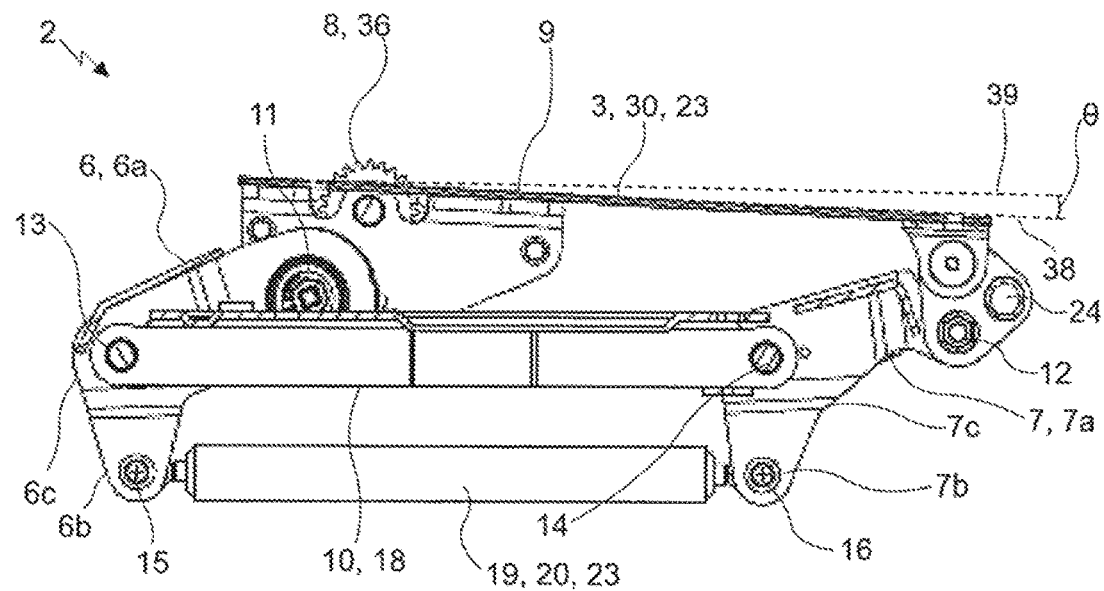

The angle of inclination θ extends between a central axis 38 of the at least one support element 3 and a reference axis 39, which is substantially parallel to the longitudinal axis X of the device 2. The change in the angle of inclination θ is proportional to the change in the length of the connecting element 19. FIGS. 4*a* and 15*a* show an inclination of the support element 3 or the seat part 4 to the rear. The second axis of rotation 12, the seventh axis of rotation 34 and thus a front edge region of the support element 3 or of the seat part 4 are displaced or pivoted upward along the height axis Z. The length of the connecting element 19 has been increased and the sixth axis of rotation 16 has been shifted forward substantially along the longitudinal axis X. Accordingly, the angle of inclination θ has positive values. In FIGS. 4*b* and 15*b*, the support element 3 or the seat part is oriented substantially horizontally. The angle of inclination θ between a central axis 38 and the reference axis 39 is thus substantially 0°. FIGS. 4*c* and 15*c* show a forward inclination of the support element 3, or of the seat part 4. The second axis of rotation 12, the seventh axis of rotation 34 and thus a front edge region of the support element 3 or of the seat part 4 are displaced or pivoted downwards along the height axis Z. The length of the connecting element 19 has been reduced and the sixth axis of rotation 16 has been displaced backward substantially along the longitudinal axis X. The angle of inclination θ in this case has negative values. FIG. 4*d* shows the vehicle seat 1, with various inclination settings of the vehicle seat 1 being indicated.

The spacing element or the connecting rod 33 rotates accordingly when the inclination changes according to FIGS. 4*a* to 4*c* and 15*a* to 15*c*. With the substantially horizontal alignment of the seat part 4 in FIGS. 4*b* and 15*b*, the spacing element or the connecting rod 33 is aligned such that the second axis of rotation 12 and the seventh axis of rotation 34 are arranged one above the other substantially along the height axis Z. In the inclination arrangement of the seat part 4 according to FIGS. 4a and 15a, the spacing element or the connecting rod 33 is oriented such that the seventh axis of rotation 34 is displaced forward relative to the second axis of rotation 12 along the longitudinal direction X. In the inclination arrangement of the seat part 4 according to FIGS. 4c and 15c, the spacing element or the connecting rod 33 is oriented in such a way that the seventh axis of rotation 34 is displaced backward relative to the second axis of rotation 12 along the longitudinal direction X.

The length of the connecting element 19 is continuously adjustable. In addition, the connecting element 19 is suitable and provided for maintaining its modifiable length, preferably until a new modification is carried out. Corresponding undesirable forces applied to the device 2 or the connecting element 19 thus do not cause any undesired change in the length of the connecting element 19. The connecting element 19 can be a lockable gas spring or an adjusting element. However, other similar elements by means of which the length can be modified and retained are likewise conceivable. An adjusting element comprises, for example, a screw jack which is driven by a drive, for example an electric motor. The screw jack converts the rotating movement of the drive into a linear movement. In the rest position, the screw jack blocks any further linear movement. Lockable gas springs can be locked steplessly in the pulling or pushing direction. As a rule, lockable gas springs comprise a piston-valve system which separates the two pressure spaces in the spring from one another. This allows for a stepless blocking without any effort. The gas spring blocks, if the valve tappet is released from the outside and the exchange between the two pressure chambers is interrupted.

The connecting element can be operated manually by means of an operating element, for example a lever. Alternatively or cumulatively, an operating and control device 38, by means of which the connecting element 19 can be controlled can be provided. The one operating and control device 38 can include an operating element 40, which can be a lever, a button, a joystick or the like. The operating and control device 38 can furthermore comprise a memory device 39, by means of which certain length values of the connecting element 19 can be stored. This is shown, for example, in FIG. 4d. The user can therefore directly control certain preferred inclination settings.

The angle $\alpha$ can be adjusted by means of an angle adjustment device 8. A change in the angle $\alpha$ causes a displacement of the at least one support element 3 along a height axis Z and along a longitudinal axis X. A change in the angle $\alpha$, which causes a downward displacement of the at least one support element 3 along the height axis Z, also causes a forward displacement of the at least one support element 3 along the longitudinal axis X. A change in the angle $\alpha$, which causes the at least one support element 3 to be displaced upward along the height axis Z, at the same time causes the at least one support element 3 to be displaced backward along the longitudinal axis X.

The first section 6a of the at least one first leg 6 and the first section 7a of the at least one second leg 7 have the same length. The first axis of rotation 11 and the second axis of rotation 12 lie on a first imaginary or real connecting line 17. The third axis of rotation 13 and the fourth axis of rotation 14 also lie on a second imaginary or real connecting line 18. The first connecting line 17, the second connecting line 18 and the first sections 6a, 7a of the at least one first leg 6 and the at least one second leg 7 thus form a first trapezoid 21. This can be seen clearly in FIG. 2c. Since the two connecting lines 17 and 18 have the same length, the trapezoid 21 is a parallelogram.

Figure 9:
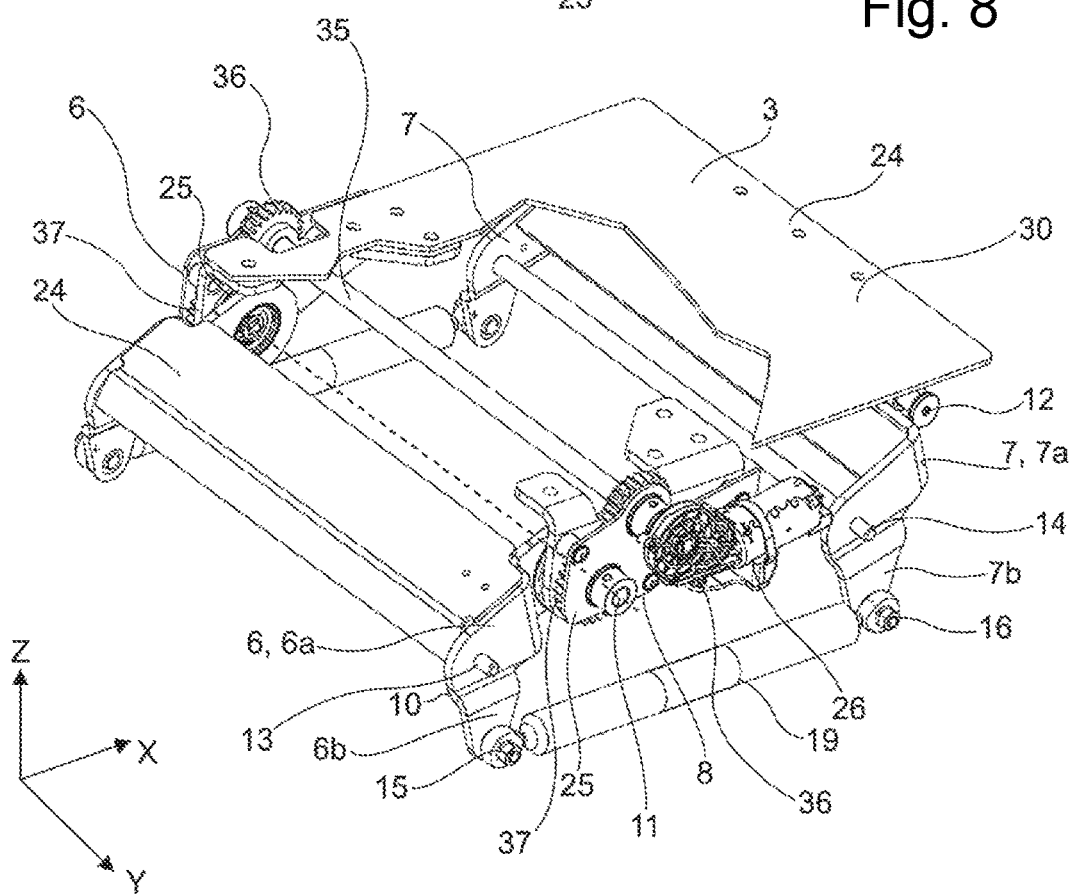
FIG. 9 shows an isometric view of the device for the adjustment of a seat position.

FIG. 9 shows that a pivot joint or a pivot bearing is arranged in the end regions of the two first legs 6, in the end regions of the two second legs 7 and in the bend regions 6c, 7c. The respective axis of rotation 11, 12, 13, 14, 15, 16 is therefore imaginary. Of course, a continuous real axis of rotation 11, 12, 13, 14 could also be provided in each case.

The fifth axis of rotation 15 and the sixth axis of rotation 16 lie on a third imaginary or real connecting line 20.

In the embodiments according to FIGS. 2a to 2c and 4a to 4d, the second section 6b of the at least one first leg 6 and the second section 7b of the at least one second leg 7 have the same length. Accordingly, the second connecting line 18, the third connecting line 20 and the second sections 6b, 7b form a second trapezoid 22.

In the embodiments according to FIGS. 3a to 3c and 5a to 5c, the second section 7b of the at least one second leg 7 is longer than the second section 6b of the at least one first leg 6. The second connecting line 18, the third connecting line 20 and the second sections 6b, 7b accordingly form a rectangle 31. As a result, when the angle $\alpha$ changes, in addition to a change in the seat position along the height axis Z and the change in the seat position along the longitudinal axis X, a change in the inclination of the seat part 4 or the support element 3 can be caused as well. With a corresponding adjustment of the length of the connecting element 19, the inclination of the seat part 4 can be adjusted in such a way that the seat part 4 is aligned horizontally.

The first connecting line 18 can accordingly correspond to the first longitudinal connection 9. FIGS. 1 to 14, however, show that the first longitudinal connection 9 and the first imaginary connecting line 18 are spaced from one another along the height axis Z. The second connecting line 18 corresponds to the second longitudinal connection 10, but the invention is not limited to this arrangement. The third connecting line 20 can, but does not have to, correspond to the third longitudinal connection 23 or the connecting element 19. The mechanical coupling preferably comprises the first longitudinal connection 9, the second longitudinal connection 10, and the third longitudinal connection 23. Furthermore, in the embodiment in which the first legs 6 and second legs 7 are designed as pairs of legs, the transverse connection 24 can be considered to belong to the mechanical coupling.

The at least one first leg 6, or the corresponding pair of legs, is arranged directly on the support element 3 via a pivot bearing, or is rotatably mounted. The first axis of rotation 11 accordingly runs centrally through this pivot bearing. The at least one second leg 7, or the corresponding pair of legs, is indirectly arranged or supported on the support element 3 via the spacing element 33 and a corresponding pivot bearing. Furthermore, the spacing element 33 is arranged on the support element 3 by means of a further pivot bearing. The second axis of rotation 12 accordingly runs centrally through this pivot bearing. The at least one second leg 7 or the corresponding pair of legs can also be arranged or supported directly on the support element 3 via a pivot bearing.

In the embodiment shown in FIGS. 2a to 2c, the kinematics of the height adjustment is implemented in the form of a second trapezoid 22. This trapezoid 22 can be changed in order to allow for an additional inclination adjustment via the degree of freedom of the movable connecting rod 33. In the event of a change in height, the seat part 4 moves upward (downward) parallel to the starting position, i.e. no angle change is made in the plane XY with respect to the seat part 4. An angle change can only take place by changing the length of the connecting element 19. At the same time, the seat part 4 moves backward (forward) in the longitudinal direction X due to the pivoting movement of the legs 6, 6. If no inclination adjustment is required in this embodiment, the kinematics can also be designed as a simple parallelogram. In this case, the connecting rod 33 can also be omitted and is then connected directly to the support element 3 adapted for this purpose via the second axis of rotation 12. FIG. 2a shows a lowermost position in which the lowest seat height is assumed. Furthermore, the seat position in the longitudinal direction X is at its maximum in the forward direction. In FIG. 2c, a top position is shown in which the maximum seat height and the maximum backward seat position in the longitudinal direction X is assumed. FIG. 2b shows a corresponding middle seat position. The seat position in the longitudinal direction can, however, optionally be modified further by an additional adjustment device.

Figure 3B:
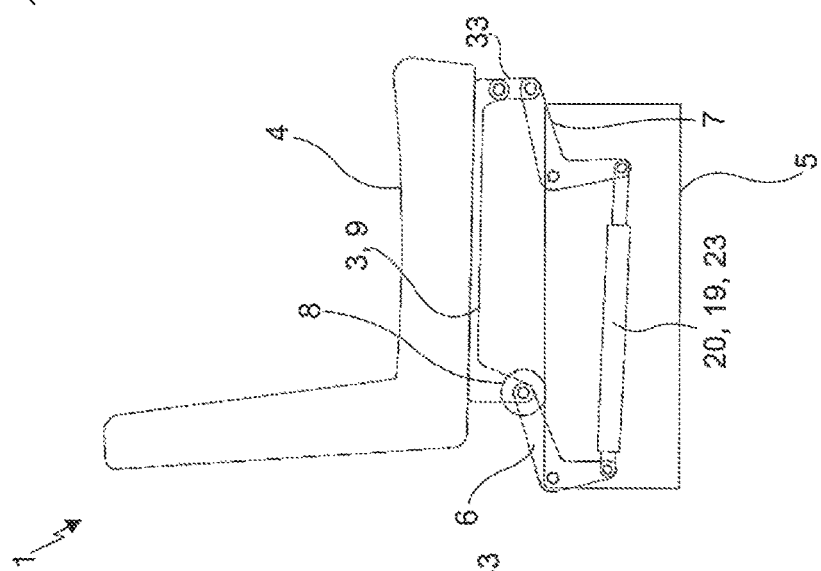
Figure 3A:
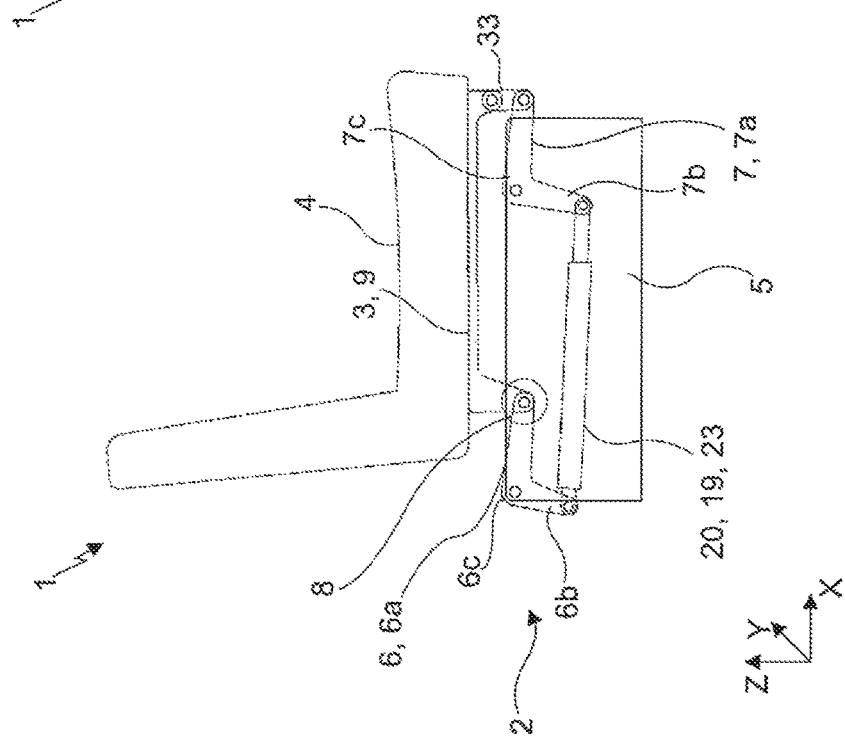

In the embodiment shown in FIGS. 3a to 3c, the kinematics of the height adjustment is implemented in the form of a rectangle. This allows for a further change in the inclination of the upper part of the seat in the XY plane. In the event of a change in height, the seat part 4 does not move upward (downward) parallel to the starting position, i.e. an angle change is made in the plane XY with respect to the seat part 4. This kinematic sequence is achieved through different geometries of the two legs 6, 7. In the drawings shown, the seat tilts forward or backward when the height changes. An additional inclination adjustment is possible by means of the connecting element 19 which can be modified in its length. The connecting element 19 can, however, also be provided as a rigid element. In this case, however, it is necessary that a spacing element 33 or connecting rod is provided. By pivoting the spacing element 33 about the second axis of rotation 12 and the seventh axis of rotation 34, a corresponding compensation can take place along the longitudinal axis X, thereby avoiding an inclination of the seat part 4. Accordingly, the height of the seat part 4 can be changed upward (downward) parallel to the starting position, i.e. no change is made to the angle in the plane XY with respect to the seat part 4. FIG. 3a shows a lowermost position in which the lowest seat height is assumed. Furthermore, the seat position in the longitudinal direction X is at its maximum in the forward direction. FIG. 3c shows a top position in which the maximum seat height and the maximum backward seat position in the longitudinal direction X is assumed. In this case, the seat part is substantially horizontal due to a corresponding rotation of the connecting rod 33. FIG. 3b shows a corresponding middle seat position. The seat position in the longitudinal direction can, however, optionally be modified further by an additional adjustment device.

In the embodiment based on FIGS. 4a to 4c, the kinematics are shown by means of a second trapezoid 22. In these kinematics, the inclination is adjusted by changing the length of the connecting element 19. Starting from the central position, an angle change in the XY plane about the Y axis of approx. +/−3° is provided in the case shown. In the version described, the connecting element 19 is designed as a lockable gas spring. This gas spring comprises a defined extension force and also defined end positions (input/output). Other designs are also possible for this connecting element 19, such as an electrical variant in the form of a screw jack with the possibility of memorisation. FIG. 4b shows a seat position in which the seat part is oriented substantially horizontally or parallel to a plane XY, which is spanned by the longitudinal axis X and the width axis Y. FIG. 4a shows a seat position in which the seat part 4 inclines backwards. In comparison to the seat position in FIG. 4b, the connecting element 19 has a greater length here. FIG. 4c shows a seat position in which the seat part 4 inclines forward. In comparison to the seat position in FIG. 4b, the connecting element 19 has a shorter length. Here, too, a corresponding compensation of the deflection along the longitudinal axis is made possible by a rotation of the connecting rod 33.

In the embodiment based on FIGS. 5a to 5c, the kinematics of the height adjustment is implemented in the form of a rectangle, which allows for an additional inclination adjustment by means of a length-modifiable connecting element 19, similar to the embodiment according to FIGS. 4a to 4c. In contrast to this embodiment, the change in inclination in the upward adjusted area is mainly used to allow for the plane XY to be horizontal. In the lower to middle positions, the system behaves similarly to the embodiment based on FIGS. 5a to 5c. FIG. 4b shows a seat position in which the seat part is oriented substantially horizontally or parallel to a plane XY, which is spanned by the longitudinal axis X and the width axis Y. FIG. 5b shows a seat position in which the seat part is oriented substantially horizontally or parallel to the XY plane. FIG. 5a shows a seat position in which the seat part 4 inclines backward. In comparison to the seat position in FIG. 5b, the connecting element 19 has a greater length. FIG. 5c shows a seat position in which the seat part 4 inclines forward. In comparison to the seat position in FIG. 4b, the connecting element 19 has a shorter length. Here, too, a corresponding compensation of the deflection along the longitudinal axis is made possible by a rotation of the connecting rod 33.

Figure 6:
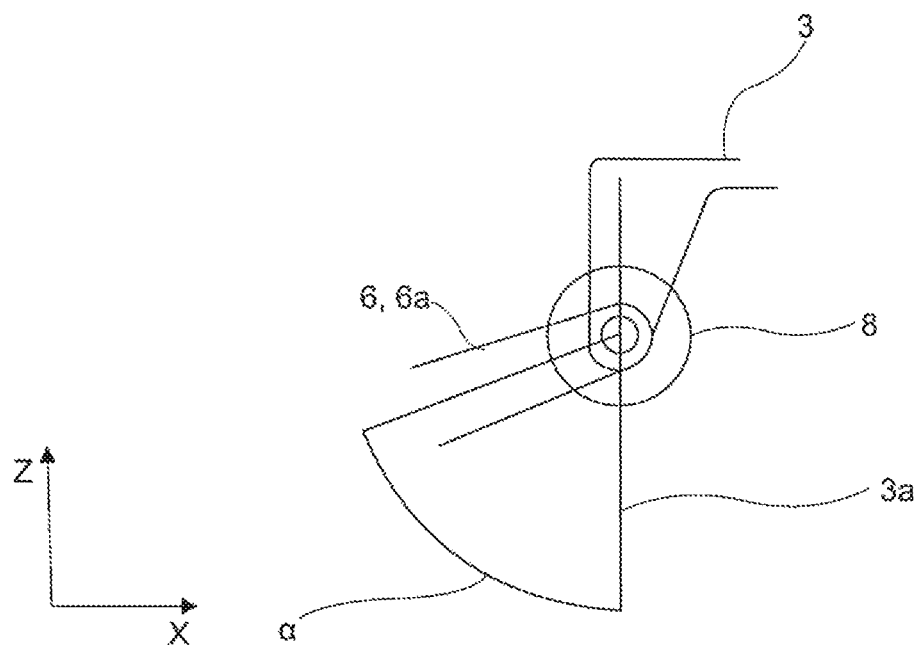
FIG. 6 shows a detailed view comprising the first axis of rotation.

FIG. 6 shows the area around the first axis of rotation 11 in an enlarged manner. In particular, the angle $\alpha$ is clearly visible here. The angle $\alpha$ extends between a central axis 6d of the first leg 6 and a imaginary reference line of the support element 3a. This reference line is substantially perpendicular to the plate-like element 30. In the case of an inclination-free alignment of the support element 3 or the seat part 4, in which the seat part 4 runs substantially parallel to plane XY, the reference line of the support element 3a is substantially parallel to the height axis Z. The angle $\alpha$ is in a range between 0° and 140°. The angle $\alpha$ is preferably in a range between 0° and 120°. The angle $\alpha$ is more preferably in a range between 0° and 90°.

Figure 7:
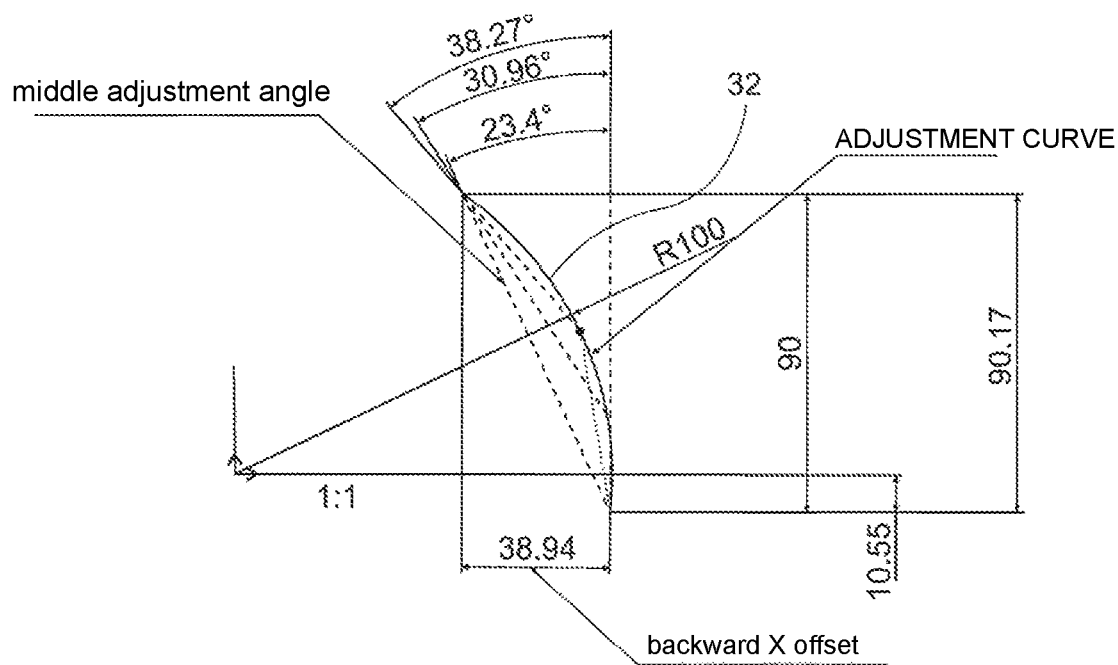
FIG. 7 shows the adjustment curve of the vehicle seat.
Figure 8:
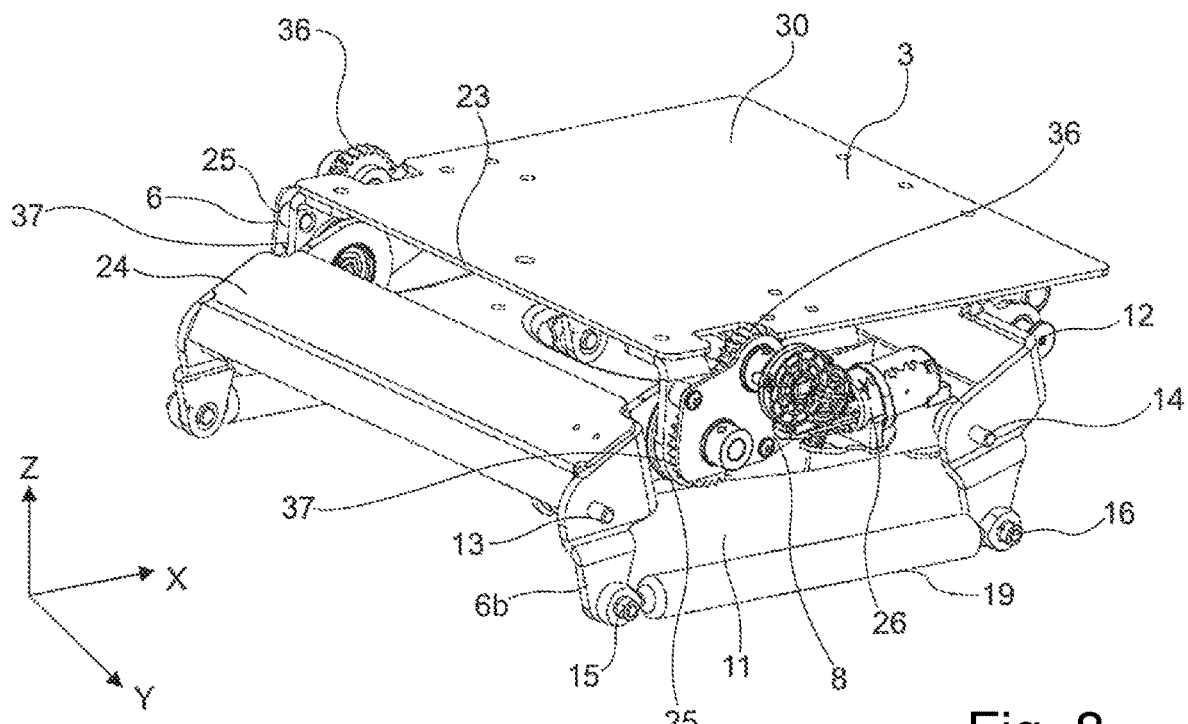
FIG. 8 shows an isometric view of the device for the adjustment of a seat position.

An adjustment curve 32 of the vehicle seat 1 can be seen in FIGS. 1a, 1b and 7. A change in the angle $\alpha$, which causes the at least one support element 3 or the seat part 4 to be displaced downwards along the height axis Z, simultaneously causes the at least one support element 3 or the seat part 4 to be displaced forward along the longitudinal axis X. A change in the angle $\alpha$, which causes the at least one support element 3 or the seat part 4 to be displaced upwards along the height axis Z, simultaneously causes the at least one support element 3 or the seat part to be displaced backward along the longitudinal axis X. FIG. 7 shows exemplary values for the adjustment angle, the backward offset and the upward offset. The invention is of course not limited to these values.

The angle adjustment device 8 can be clearly seen in FIGS. 8 to 14. The angle adjustment device 8 comprises a locking device 25, which can also be referred to as a recliner and which locks an adjusted angle $\alpha$. Furthermore, the angle adjustment device 8 comprises a drive 26, by means of which the locking device 25 is driven in order to change the angle $\alpha$. The angle adjustment device 8 preferably comprises a control unit which controls the drive 26. It is advantageous that certain seat positions can be stored in the control unit. The user can then switch between the saved positions. An operating device by means of which the user can make appropriate inputs is preferably provided. The drive 26 is connected to a primary shaft 35 in a form-fitting manner. The primary shaft 35, which is provided for space reasons, extends from the right to the left side and comprises at both ends a spur gear 36 which is likewise connected in a form-fitting manner. The spur gears 36 of the primary shaft 35 each transmit the force to a further spur gear 37; these are also connected to a respective locking device 25 or recliner in a form-fitting manner by means of short secondary axles. The two locking devices 25 non-positively connect the first legs 6 on the left and right to the support element 3. When the height adjustment is actuated, the drive 26 accordingly generates a torque. The torque and the rotation are transmitted from the primary shaft 35 to the secondary shafts, which are connected to the locking device 25, by means of the spur gears 36, 37. The torque is accordingly transmitted synchronously to the left and to the right. This causes the first legs to pivot relative to the support element 3.

Figure 10:
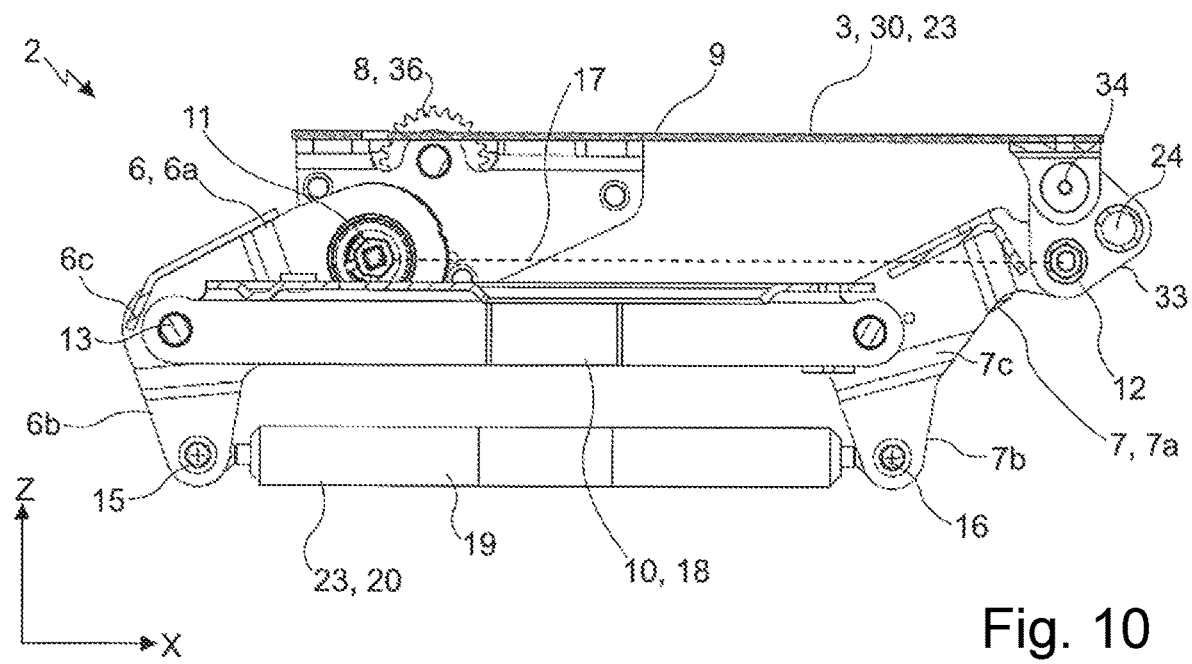
FIG. 10 shows a side view of the device for the adjustment of a seat position.
Figure 11:
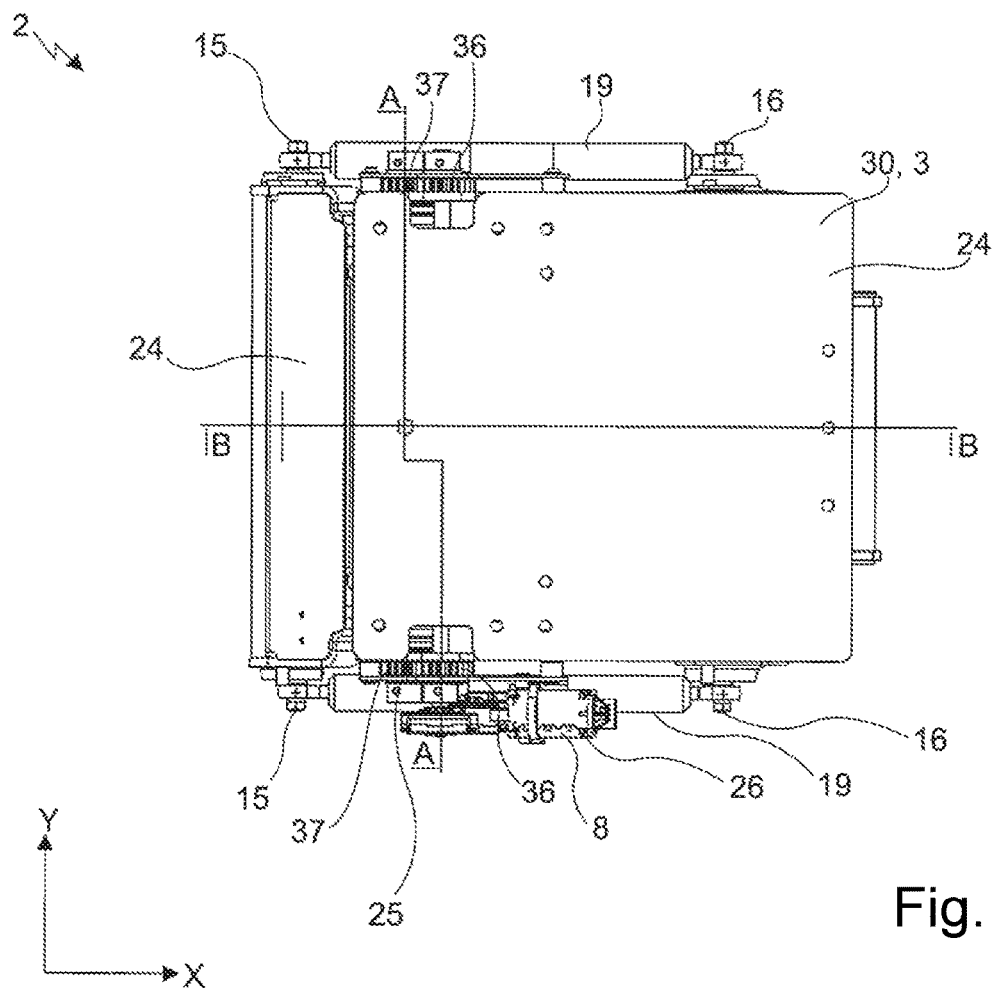
FIG. 11 shows a top view of the device for the adjustment of a seat position.
Figure 12:
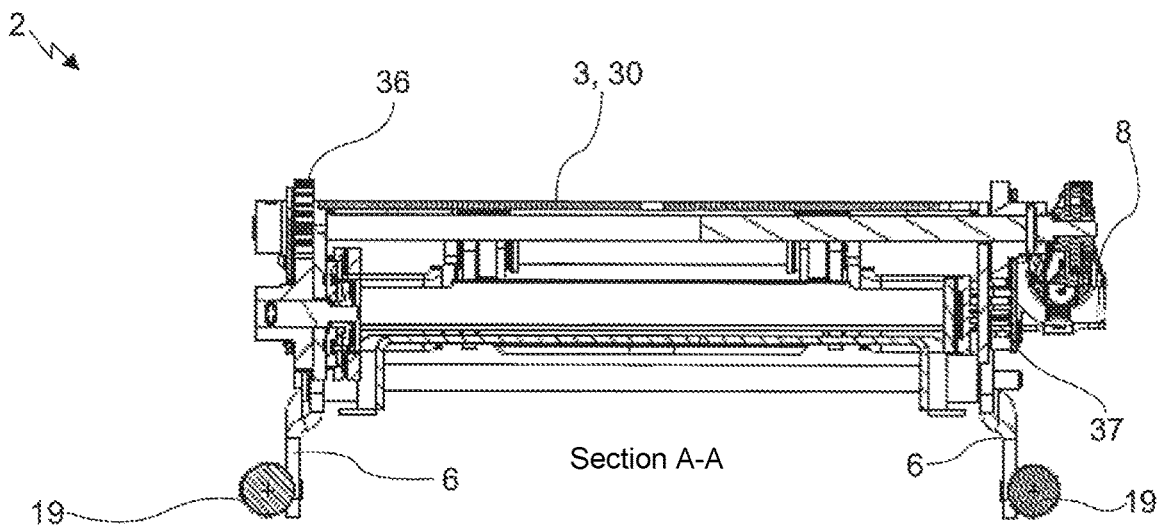
FIG. 12 shows a side view of the device for the adjustment of a seat position.
Figure 13:
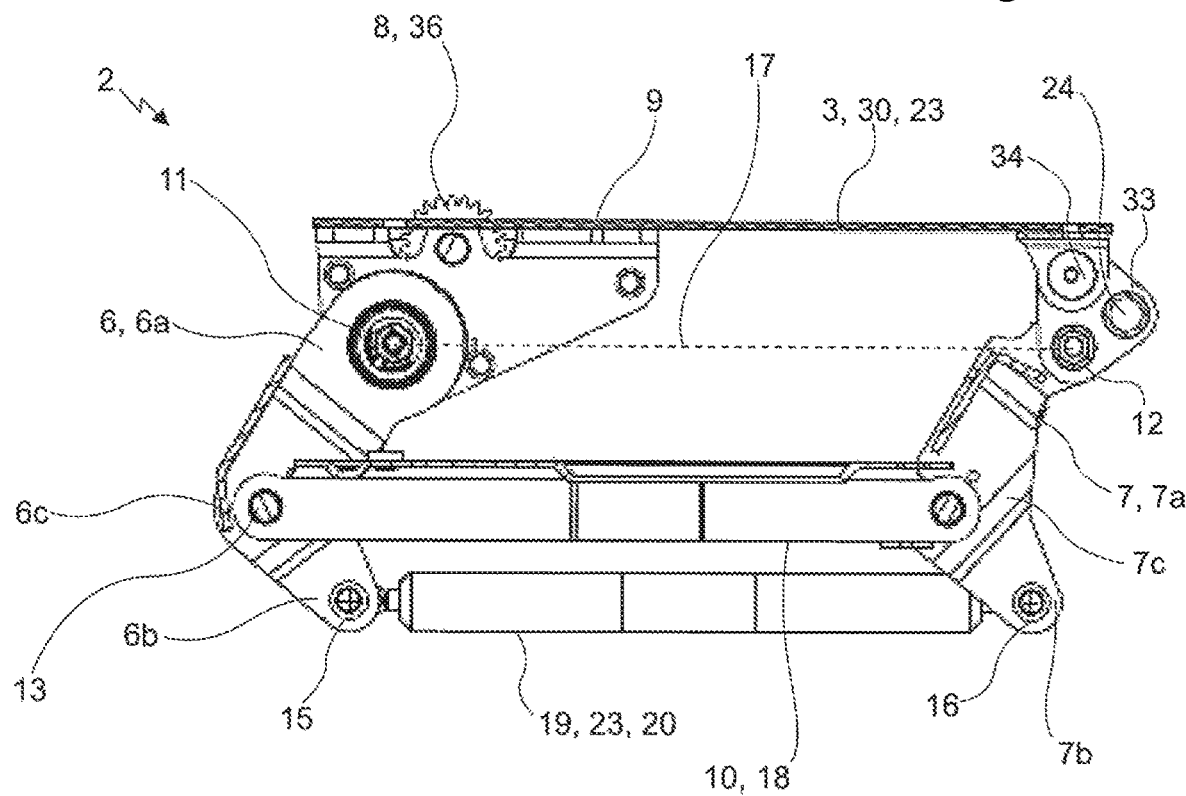
FIG. 13 shows a side view of the device for the adjustment of a seat position.
Figure 14:
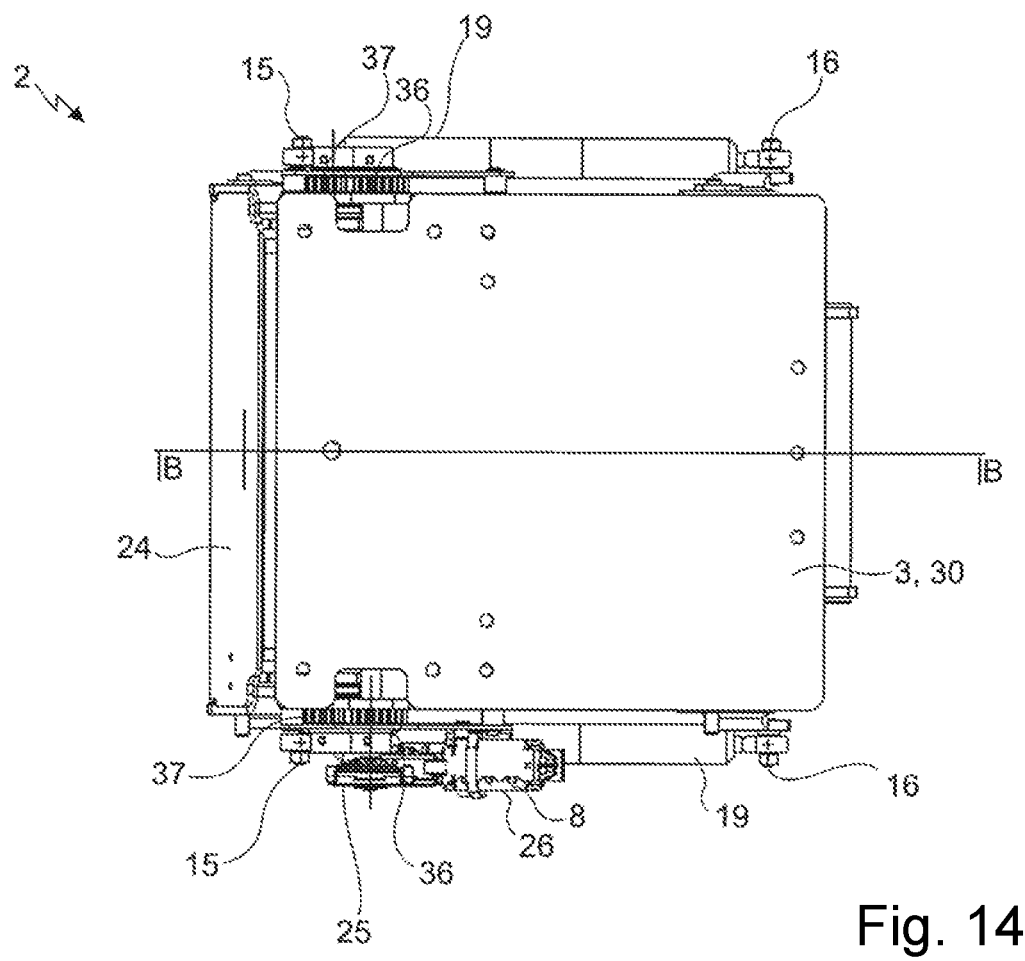
FIG. 14 shows a top view of the device for the adjustment of a seat position.

FIGS. 11 and 14 each provide a top view of the device 2, with a section of the device 2 being shown in FIG. 12. FIGS. 10 and 13 show a side view in which the pivoting of the legs 6, 7 to the support element 3 can be seen. The equalisation or forced control of the first leg 6 is performed by the connecting element 19, which can be designed as a rigid element or as an element whose length can be changed.

Such a device 2 can be configured separately from the vertical suspension. Consequently, the height adjustment and spring travel cannot be influenced. The device offers an ergonomic adjustment of the seat and creates a height-dependent distance to the steering wheel and the pedals.

All features disclosed in the application documents are claimed as being essential to the invention, provided that they are, individually or in combination, novel over the prior art.

LIST OF REFERENCE SIGNS

1 Vehicle seat
2 Device for adjusting a seat position
3 Support element
3a Reference line of the support element
4 Seat part
5 Seat substructure
6 First leg
6a First section of the first leg
6b Second section of the first leg
6c Bend region of the first leg
6d Central axis of the first leg
7 Second leg
7a First section of the second leg
7b Second section of the second leg
7c Bend region of the second leg
8 Angle adjustment device
9 First longitudinal connection
10 Second longitudinal connection
11 First axis of rotation
12 Second axis of rotation
13 Third axis of rotation
14 Fourth axis of rotation
15 Fifth axis of rotation
16 Sixth axis of rotation
17 First connecting line
18 Second connecting line
19 Connecting element
20 Third connecting line
21 First trapezoid
22 Second trapezoid
23 Third longitudinal connection
24 Transverse connection
25 Locking device
26 Drive
27 Scissor frame
28 Spring and/or damping device
29 Body floor
30 Plate-like element
31 Square
32 Adjustment curve
33 Spacing element/connecting rod
34 Seventh axis of rotation
35 Primary shaft
36 Spur gear
37 Spur gear
38 Operating and control device
39 Memory device
40 Operating element
Z Height axis
X Longitudinal axis
Y Width axis
α Angle
β Angle
θ Angle of inclination

What is claimed is:

1. A device for adjusting a seat position for a vehicle seat, the device comprising at least one support element for a seat part and that can be connected to a seat substructure,
wherein the device comprises at least one first leg and at least one second leg, wherein the at least one first leg and the at least one second leg can be rotatably arranged on the seat substructure and the at least one support element, wherein the at least one first leg and the at least one second leg are mechanically coupled by a connecting element, a length of which is modifiable, wherein a modification of the length of the connecting element causes a change in an angle of inclination of the support element, wherein the at least one first leg is mounted to a first axis of rotation relative to the seat substructure, wherein the at least one second leg is mounted to a second axis of rotation relative to the seat substructure, wherein a distance between the first axis of rotation and the second axis of rotation is fixed, wherein the at least one first leg and the at least one second leg are each rotatably mounted about an axis of rotation relative to the support element, wherein, in an upper end region of a first section, the axis of rotation is arranged with respect to the rotation relative to the support element, wherein the axis of rotation with respect to the rotation relative to the seat substructure is arranged in a bend region, and wherein the modification of the length of the connecting element causes a rotation of the at least one second leg about at least the axis of rotation with respect to a rotation relative to the connecting element and about the axis of rotation with respect to a rotation relative to the seat substructure, with the modification of the length of the connecting element not causing any rotation of the at least one first leg.

2. The device according to claim 1, wherein the angle of inclination extends between a central axis of the at least one support element and a reference axis that is substantially parallel to a longitudinal axis of the device, and wherein the angle of inclination is proportional to the length of the connecting element.

3. The device according to claim 1, wherein the connecting element maintains a modified length of the connecting element, wherein the connecting element can be controlled by an operating and control device, wherein the operating and control device comprises a memory device that can store certain length values of the connecting element, wherein the length of the connecting element is continuously adjustable, wherein the connecting element is a lockable gas spring or an adjusting element, and wherein the adjusting element comprises a screw jack.

4. The device according to claim 1, wherein the at least one first leg is arranged along a longitudinal axis behind the at least one second leg, wherein the at least one first leg along the longitudinal axis is connected to the at least one second leg by a first longitudinal connection, that is realised by the at least one support element or by the seat part, wherein the at least one first leg and the at least one second leg each have a first section and a second section, wherein the first section and the second section each enclose a first angle, wherein the at least one first leg and the at least one second leg are substantially L-shaped, and wherein a bend region is provided between the first section and the second section.

5. The device according to claim 4, wherein the connecting element is arranged between the second section of the at least one first leg and the second section of the at least one second leg, wherein the respective second section is rotatable about an axis of rotation relative to the connecting element, and wherein the axis of rotation with respect to a rotation of the at least one first leg or the at least one second leg relative to the connecting element is arranged in a lower end region of the respective second section.

6. The device according to claim 1, wherein the at least one first leg and the support element enclose a first angle, wherein the first angle is adjustable by an angle adjustment device, wherein a change in the first angle causes a displacement of the at least one support element along a height axis and along a longitudinal axis, wherein a change in the first angle that causes a downward displacement of the at least one support element along the height axis at the same time causes a forward displacement of the at least one support element along the longitudinal axis, and wherein a change in the first angle that causes an upward displacement of the at least one support element along the height axis at the same time causes a backward displacement of the at least one support element along the longitudinal axis.

7. The device according to claim 1, wherein the at least one second leg is indirectly connected to the at least one support element, the at least one second leg being connected to the support element via a spacing element, wherein the spacing element is rotatable about an axis of rotation relative to the at least one second leg, and wherein the spacing element is rotatable about a further axis of rotation relative to the support element.

8. The device according to claim 1, wherein a first section of the at least one first leg and a first section of the at least one second leg have the same length, wherein axes of rotation with respect to the rotation relative to the support element of the at least one first leg and the at least one second leg lie on a first imaginary or real connecting line, wherein the axes of rotation with respect to the rotation relative to the seat substructure of the at least one first leg and the at least one second leg lie on a second imaginary or real connecting line, and wherein the first connecting line, the second connecting line, the first section of the at least one first leg, and the first section of the at least one second leg form a quadrilateral shape.

9. The device according to claim 6, wherein a second section of the at least one first leg and a second section of the at least one second leg have the same length, wherein the axes of rotation with respect to the rotation of the at least one first leg and the at least one second leg relative to the connecting element lie on a third imaginary or real connecting line, and wherein a second connecting line, the third connecting line and the second sections of the at least one first leg and the at least one second leg form a second trapezoid.

10. The device according to claim 1, wherein two first legs and two second legs are provided, the two first legs being spaced from one another along a width axis and being rotatable about the same axes of rotation, wherein the two second legs are spaced from one another along the width axis and are rotatable about the same axes of rotation, and wherein the two first legs and the two second legs opposite one another along the width axis are connected by at least one transverse connection.

11. The device according to claim 1, wherein the device is a modular component.

12. A vehicle seat having a device according to claim 1.

13. The vehicle seat according to claim 12, wherein the vehicle seat comprises a scissor frame that attaches the vehicle seat to a body floor, and wherein the vehicle seat comprises at least one of a spring or damping device for suspension/damping of at least one of vertical vibrations or horizontal vibrations.

14. A device for adjusting a seat position for a vehicle seat, the device comprising:
 a support element for a seat part, the support element capable of being connected to a seat substructure of the vehicle seat;
 a first leg rotatably arranged on the seat substructure and the support element;
 a second leg rotatably arranged on the seat substructure and the support element; and
 a connecting element that mechanically couples the first leg and the second leg, wherein a length of the connecting element is modifiable,
 wherein an extension of the connecting element causes a positive change in an angle of inclination of the support element, wherein a contraction of the connection element causes a negative change in the angle of inclination of the support element,
 wherein the angle of inclination extends between a central axis of the support element and a reference axis that is substantially parallel to a longitudinal axis of the device, wherein the angle of inclination is proportional to the length of the connecting element,
 wherein the first leg and the support element enclose a first angle that is adjustable by an angle adjustment device, wherein a change in the first angle that causes a downward displacement of the support element along a height axis also causes a forward displacement of the support element along the longitudinal axis, and wherein a change in the first angle that causes an upward displacement of the support element along the height axis also causes a backward displacement of the support element along the longitudinal axis.

15. The device according to claim 14, wherein a first longitudinal connection connects the first leg and the second leg, wherein the first leg and the second leg are both substantially L-shaped, and wherein the first leg is disposed along the longitudinal axis behind the second leg.

16. The device according to claim 14, wherein the first leg is mounted to a first axis of rotation relative to the seat substructure, wherein the second leg is mounted to a second axis of rotation relative to the seat substructure, and wherein a distance between the first axis of rotation and the second axis of rotation is fixed.

17. A device for adjusting a seat position for a vehicle seat, the device comprising at least one support element for a seat part and that can be connected to a seat substructure, wherein the device comprises at least one first leg and at least one second leg, wherein the at least one first leg and the at least one second leg can be rotatably arranged on the seat substructure and the at least one support element, wherein the at least one first leg and the at least one second leg are mechanically coupled by a connecting element, a length of which is modifiable, wherein a modification of the length of the connecting element causes a change in an angle of inclination of the support element, wherein the at least one first leg is mounted to a first axis of rotation relative to the seat substructure, wherein the at least one second leg is mounted to a second axis of rotation relative to the seat substructure, wherein a distance between the first axis of rotation and the second axis of rotation is fixed, wherein the at least one second leg is indirectly connected to the at least one support element, the at least one second leg being connected to the support element via a spacing element, wherein the spacing element is rotatable about an axis of rotation relative to the at least one second leg, and wherein the spacing element is rotatable about a further axis of rotation relative to the support element.

\* \* \* \* \*